US011763165B2

(12) United States Patent
Zhang et al.

(10) Patent No.: US 11,763,165 B2
(45) Date of Patent: Sep. 19, 2023

(54) SELECTIVE SENSING: A DATA-DRIVEN NONUNIFORM SUBSAMPLING APPROACH FOR COMPUTATION-FREE ON-SENSOR DATA DIMENSIONALITY REDUCTION

(71) Applicant: ARIZONA BOARD OF REGENTS ON BEHALF OF ARIZONA STATE UNIVERSITY, Scottsdale, AZ (US)

(72) Inventors: Zhikang Zhang, Mesa, AZ (US); Fengbo Ren, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 231 days.

(21) Appl. No.: 17/317,372

(22) Filed: May 11, 2021

(65) Prior Publication Data

US 2021/0349945 A1   Nov. 11, 2021

Related U.S. Application Data

(60) Provisional application No. 63/022,735, filed on May 11, 2020.

(51) Int. Cl.
  *G06N 3/084*   (2023.01)
  *G06F 16/901*   (2019.01)
  (Continued)

(52) U.S. Cl.
  CPC .......... *G06N 3/084* (2013.01); *G06F 16/901* (2019.01); *G06F 18/213* (2023.01); *G06N 3/04* (2013.01);
  (Continued)

(58) Field of Classification Search
  CPC ............ G06N 3/084; G06N 3/04; G06N 3/08; G06N 20/00; G06N 3/02; G06N 3/045;
  (Continued)

(56) References Cited

U.S. PATENT DOCUMENTS 9,654,752 B2   5/2017  Baraniuk et al.
10,924,755 B2  2/2021  Ren et al.
(Continued)

OTHER PUBLICATIONS

Arbeláez, P. et al., "Contour Detection and Hierarchical Image Segmentation," IEEE Transactions on Pattern Analysis and Machine Intelligence, vol. 33, No. 5, May 2011, IEEE, pp. 898-916.
(Continued)

*Primary Examiner* — Evan Aspinwall
(74) *Attorney, Agent, or Firm* — MH2 TECHNOLOGY LAW GROUP LLP

(57) ABSTRACT

A data-driven nonuniform subsampling approach for computation-free on-sensor data dimensionality is provided, referred to herein as selective sensing. Designing an on-sensor data dimensionality reduction scheme for efficient signal sensing has long been a challenging task. Compressive sensing is a generic solution for sensing signals in a compressed format. Although compressive sensing can be directly implemented in the analog domain for specific types of signals, many application scenarios require implementation of data compression in the digital domain. However, the computational complexity involved in digital-domain compressive sensing limits its practical application, especially in resource-constrained sensor devices or high-data-rate sensor devices. Embodiments described herein provide a selective sensing framework that adopts a novel concept of data-driven nonuniform subsampling to reduce the dimensionality of acquired signals while retaining the information of interest in a computation-free fashion.

20 Claims, 6 Drawing Sheets

(51) Int. Cl.
G06N 3/04 (2023.01)
G06N 3/08 (2023.01)
G06F 18/213 (2023.01)
G06V 10/764 (2022.01)
G06V 10/82 (2022.01)

(52) U.S. Cl.
CPC ............. *G06N 3/08* (2013.01); *G06V 10/764* (2022.01); *G06V 10/82* (2022.01)

(58) Field of Classification Search
CPC . G06N 7/01; G06N 3/042; G06N 5/01; G06F 16/901; G06F 18/213; G06V 10/82; G06V 10/764; H04W 4/70; H04W 4/38
USPC .......................................................... 707/741
See application file for complete search history.

(56) References Cited

U.S. PATENT DOCUMENTS

| | | |
|---|---|---|
| 2008/0137753 A1 | 6/2008 | He |
| 2008/0216116 A1 | 9/2008 | Pekonen et al. |
| 2010/0272184 A1 | 10/2010 | Fishbain et al. |
| 2017/0188813 A1 | 7/2017 | Arnold et al. |
| 2017/0256033 A1 | 9/2017 | Tuzel et al. |
| 2018/0174052 A1 | 6/2018 | Rippel et al. |
| 2019/0251360 A1 | 8/2019 | Cricri et al. |
| 2019/0257905 A1* | 8/2019 | Cheng ............... G01R 33/5608 |
| 2019/0259384 A1* | 8/2019 | Singh ....................... G06N 3/08 |
| 2019/0318227 A1 | 10/2019 | Bronstein et al. |
| 2020/0202160 A1 | 6/2020 | Park et al. |
| 2020/0234406 A1 | 7/2020 | Ren et al. |
| 2020/0294201 A1 | 9/2020 | Planche et al. |
| 2021/0248467 A1* | 8/2021 | Mohamed ............. G06F 18/213 |

OTHER PUBLICATIONS

Badrinarayanan, V. et al., "SegNet: A Deep Convolutional Encoder-Decoder Architecture for Image Segmentation", arXiv, (v1, submitted Nov. 2, 2015), 14 pages, arXiv:1511.00561v1.
Badrinarayanan, V. et al., "SegNet: A Deep Convolutional Encoder-Decoder Architecture for Image Segmentation", arXiv, v2, submitted Dec. 8, 2015), 14 pages, arXiv:1511.00561v2.
Bahadir, C. et al., "Deep-learning-based Optimization of the Undersampling Pattern in MRI," arXiv:1907.11374v3 [eess.IV], Jun. 18, 2020, 18 pages.
Bahadir, C. et al., "Learning-Based Optimization of the Under-Sampling Pattern in MRI," arXiv:1901.01960v2 [eess.IV], Apr. 30, 2019, 13 pages.
Bahdanau, D. et al., "Neural Machine Translation by Jointly Learning to Align and Translate", arXiv, (v1, submitted Sep. 1, 2014), 15 pages, arXiv:1409.0473v1.
Bahdanau, D. et al., "Neural Machine Translation by Jointly Learning to Align and Translate", arXiv, (v2, submitted Sep. 2, 2014), 15 pages, arXiv:1409.0473v2.
Bahdanau, D. et al., "Neural Machine Translation by Jointly Learning to Algin and Translate", arXiv, (v3, submitted Oct. 7, 2014), 15 pages, arXiv:1409.0473v3.
Bahdanau, D. et al., "Neural Machine Translation by Jointly Learning to Algin and Translate", arXiv, (v4, submitted Dec. 19, 2014), 15 pages, arXiv:1409.0473v4.
Baldassarre, L. et al., "Learning-Based Compressive Subsampling," arXiv:1510.06188v3 [cs.IT], Mar. 28, 2016, 13 pages.
Beck, A. et al., "A Fast Iterative Shrinkage-Thresholding Algorithm for Linear Inverse Problems," SIAM Journal on Imaging Sciences, vol. 2, Issue 1, 2009, Society for Industrial and Applied Mathematics, pp. 183-202.
Becker, S. et al., "NESTA: A Fast and Accurate First-Order Method for Sparse Recovery," SIAM Journal on Imaging Sciences, vol. 4, No. 1, 2011, Society for Industrial and Applied Mathematics, 39 pages.

Becker, S. et al., "Templates for convex cone problems with applications to sparse signal recovery", Mathematical Programming Computation volume, Jul. 2011, vol. 3, pp. 165-218 <DOI: 10.1007/s12532-011-0029-5>.
Behravan, V. et al., "Rate-Adaptive Compressed-Sensing and Sparsity Variance of Biomedical Signals," 2015 IEEE 12th International Conference on Wearable and Implantable Body Sensor Networks (BSN), Jun. 9-12, 2015, Cambridge, MA, USA, IEEE, 6 pages.
Bevilacqua, M. et al., "Low-Complexity Single-Image Super-Resolution based on Nonnegative Neighbor Embedding," British Machine Vision Conference (BMVC), 2012, pp. 135-1-135.10.
Blumensath, T. et al., "Iterative hard thresholding for compressed sensing," Applied and Computational Harmonic Analysis, vol. 27, Issue 3, 2009, Elsevier Inc., pp. 265-274.
Bora, A. et al., "Compressed Sensing using Generative Models," Proceedings of the 34th International Conference an Machine Learning, PMLR 70, 2017, Sydney, Australia, 10 pages.
Burger, H. et al., "Image Denoising: Can Plain Neural Networks Compete with BM3D", 2012 IEEE Conference on Computer Vision and Machine Learning (Providence, RI, Jun. 16-21, 2012), 2012 [Date Added to IEEE Xplore Jul. 2012], pp. 2392-2399 <DOI:10.1109/CVPR.2012.6247952>.
Candès, E. et al., "Compressed sensing with coherent and redundant dictionaries," Applied and Computational Harmonic Analysis, vol. 31, Issue 1, 2011, Elsevier Inc., pp. 59-73.
Candes, E., "The restricted isometry property and its implications for compressed sensing", Comptes Rendus Mathematique, May 2008 (available online Apr. 2008), vol. 346, No. 9-10, pp. 589-592 <DOI:10.1016/j.crma.2008.03.014>.
Candès, E. et al., "Robust Uncertainty Principles: Exact Signal Reconstruction From Highly Incomplete Frequency Information," IEEE Transactions on Information Theory, vol. 52, No. 2, Feb. 2006, IEEE, pp. 489-509.
Candès, E. et al., "Stable Signal Recovery from Incomplete and Inaccurate Measurements," Communications on Pure and Applied Mathematics, vol. 59, Issue 8, Wiley Periodicals, Inc., 17 pages.
Chen, T., et al., "DeepCoder: A Deep Neural Network Based Video Compression," 2017 IEEE Visual Communications and Image Processing (VCIP), Dec. 10-13, 2017, St. Petersburg, FL, IEEE, 4 pages.
Chen, X. et al., "Mind's eye: A recurrent visual representation for image caption generation", 2015 IEEE Conference an Computer Vision and Pattern Recognition (CVPR) (Boston, MA, Jun. 7-12, 2015), 2015 [Date Added to IEEE Xplore: Oct. 2015], pp. 2422-2431 <DOI:10.1109/CVPR.2015.7298856>.
Cho, K. et al., "Learning Phase Representations using RNN Encoder-Decoder for Statistical Machine Translation", arXiv, (v1, submitted Jun. 3, 2014), 14 pages, arXiv:1406.1078v1.
Cho, K. et al., "Learning Phase Representations using RNN Encoder-Decoder for Statistical Machine Translation", arXiv, (v2, submitted Jul. 24, 2014), 15 pages, arXiv:1406.1078v2.
Cho, K. et al., "Learning Phase Representations using RNN Encoder-Decoder for Statistical Machine Translation", arXiv, (v3, submitted Sep. 3, 2014), 15 pages, arXiv:1406.1078v3.
Cui, Z. et al., "Deep Network Cascade for Image Super-resolution," In Fleet, D. et al., ECCV 2014, Part V, LNCS 3693, Springer International Publishing, pp. 49-64.
Dabov, K. et al., "Image Denoising by Sparse 3-D Transform-Domain Collaborative Filtering," IEEE Transactions on Image Processing, vol. 16, No. 8, Aug. 2007, IEEE, pp. 2080-2095.
Dadkhahi, H. et al., "Masking Schemes for Image Manifolds," 2014 IEEE Workshop on Statistical Signal Processing (SSP), Jun. 29-Jul. 2, 2014, Gold Coast, Australia, IEEE, pp. 252-255.
Daubechies, I. et al., "Iteratively Reweighted Least Squares Minimization for Sparse Recovery," Communications on Pure and Applied Mathematics, vol. LXIII, 0001-0038, 2010, Wiley Periodicals, Inc., 38 pages.
Davenport, M.A., "Random Observations on Random Observations: Sparse Signal Acquisition and Processing," A Thesis Submitted in Partial Fulfillment of the Requirements for the Degree of Doctor of Philosophy, Aug. 2010, Rice University, Houston, Texas, 203 pages.

(56) References Cited

OTHER PUBLICATIONS

Davisson, L.D., "Book Reviews: 'Rate Distortion Theory: A Mathematical Basis for Data Compression," IEEE Transactions on Communications, vol. 20, No. 6, Dec. 1972, IEEE, p. 1202.
Denton, E. et al., "Deep Generative Image Models using a Laplacian Pyramid of Adversarial Networks," Advances in Neural Information Processing Systems 28 (NIPS 2015), Proceedings of the 29th Conference on Neural Information Processing Systems (NIPS), Dec. 2015, Montreal, Canada, 9 pages.
Donahue, J. et al., "Long-term Recurrent Convolutional Networks for Visual Recognition and Description," IEEE Conference on Computer Vision and Pattern Recognition (CVPR), Jun. 7-12, 2015, Boston, MA, USA, IEEE, 10 pages.
Dong, W. et al., "Compressive Sensing via Nonlocal Low-Rank Regularization," IEEE Transactions on Image Processing, vol. 23, No. 8, Aug. 2014, IEEE, pp. 3618-3632.
Dong, C. et al., "Image Super-Resolution Using Deep Convolutional Networks," IEEE Transactions on Pattern Analysis and Machine Intelligence, Jun. 2015, IEEE, 14 pages.
Dong, C. et al., "Learning a Deep Convolutional Network for Image Super-Resolution," In Fleet, D. et al., ECCV 2014, Part IV, LNCS 8692, 2014, Springer International Publishing, pp. 184-199.
Duarte, M.F. et al., "Single-Pixel Imaging via Compressive Sampling," IEEE Signal Processing Magazine, Mar. 2008, IEEE, pp. 83-91.
Duchi, J. et al., "Adaptive Subgradient Methods for Online Learning and Stochastic Optimization," Journal of Machine Learning Research, vol. 12, Jul. 2011, pp. 2121-2159.
Fowler, J.E. et al., "Block-Based Compressed Sensing of Images and Video," Foundations and Trends in Signal Processing, vol. 4, No. 4, 2012, 127 pages.
Gao, Z. et al., "Compressive Sensing Techniques for Next-Generation Wireless Communications," IEEE Wireless Communications, vol. 25, Issue 3, Feb. 8, 2018, IEEE, 10 pages.
Girshick, R. et al., "Rich Feature Hierarchies for Accurate Object Detection and Semantic Segmentation", 2014 IEEE Conference on Computer Vision and Pattern Recognition (Columbus, OH, Jun. 23-28, 2014), 2014 [Date Added to IEEE Xplore Sep. 2014], pp. 580-587 <DOI:10.1109/CVPR.2014.81>.
Glasner, D. et al., "Super-Resolution from a Single Image," IEEE 12th International Conference on Computer Vision (ICCV), Sep. 29-Oct. 2, 2009, Kyoto, Japan, IEEE, pp. 349-356.
Gozcu, B. et al., "Learning-Based Compressive MRI," IEEE Transactions on Medical Imaging, vol. 37, No. 6, Jun. 2018, IEEE, pp. 1394-1406.
Graves, A. et al., "Towards End-to-End Speech Recognition with Recurrent Neural Networks", ICML '14: Proceedings of the 31st International Conference on Machine Learning (Beijing, China, Jun. 22-24, 2014), 2014, vol. 32, 9 pages.
Guo, W. et al., "EdgeCS: Edge Guided Compressive Sensing Reconstruction," Proceedings of SPIE Visual Communications and Image Processing 2010, vol. 7744, 77440L-1, Jul. 2010, Huangshan, China, SPIE, 10 pages.
He, K. et al., "Deep Residual Learning for Image Recognition," 2016 IEEE Conference on Computer Vision and Pattern Recognition (CVPR), Jun. 27-30, 2016, Las Vegas, NV, USA, IEEE, pp. 770-778.
Hinton, G. et al., "Deep Neural Networks for Acoustic Modeling in Speech Recognition: The Shared Views of Four Research Groups", IEEE Signal Processing Magazine, Nov. 2012 (Date of Publication Oct. 2012), vol. 29, No. 6, pp. 82-97 <DOI:10.1109/MSP.2012. 2205597>.
Hinton, G. et al., "Reducing the Dimensionality of Data with Neural Networks", Science, Jul. 2006, vol. 313, No. 5786, pp. 504-507 <DOI:10.1126/science.1127647>.
Non-Final Office Action for U.S. Appl. No. 16/745,817, dated Mar. 23, 2022, 12 pages.
Shi, W. et al., "Scalable Convolutional Neural Network for Image Compressed Sensing," 2019 IEEE/CVF Conference an Computer Vision and Pattern Recognition (CVPR), Jun. 15-20, 2019, Long Beach, CA, USA, IEEE, pp. 12290-12299.
Snoek, C. et al., "Early versus Late Fusion in Semantic Video Analysis," Proceedings of the 13th ACM International Conference on Multimedia (MM), Nov. 6-11, 2005, Singapore, ACM, 4 pages.
Soomro, K. et al., "UCF101: A Dataset of 101 Human Actions Classes From Videos in the Wild," CRCV-TR-12-01, Nov. 2012, Center for Research in Computer Vision, University of Central Florida, USA, 7 pages.
Srivastava, N. et al., "Unsupervised Learning of Video Representations using LSTMs," Proceedings of the 32nd International Conference on Machine Learning (ICML), 2015, Lille, France, 10 pages.
Toderici, G., et al., "Full Resolution Image Compression with Recurrent Neural Networks," Jul. 2017, available at https://arxiv.org/abs/1608.05148, 9 pages.
Tropp, J. et al., "Signal Recovery From Random Measurements Via Orthogonal Matching Pursuit," IEEE Transactions on Information Theory, vol. 53, No. 12, Dec. 2007, IEEE, pp. 4655-4666.
Van Veen, D. et al., "Compressed Sensing with Deep Image Prior and Learned Regularization," arXiv:1806.06438v1 [stat.ML], Jun. 17, 2018, 18 pages.
Venugopalan, S. et al., "Sequence to Sequence—Video to Text," IEEE International Conference on Computer Vision (ICCV), Dec. 11-18, 2015, Santiago, Chile, IEEE, pp. 4534-4542.
Wang, Y. et al., "Data-Driven Sampling Matrix Boolean Optimization for Energy-Efficient Biomedical Signal Acquisition by Compressive Sensing," IEEE Transactions on Biomedical Circuits and Systems, vol. 11, No. 2, Nov. 14, 2016, IEEE, pp. 255-266.
Wang, Z. et al., "Image Quality Assessment: From Error Visibility to Structural Similarity," IEEE Transactions on Image Processing, vol. 13, No. 4, Apr. 2004, IEEE, 14 pages.
Weiss, T. et al., "Learning Fast Magnetic Resonance Imaging," arXiv:1905.09324v1 [eess.IV], May 22, 2019, 12 pages.
Wu, Y. et al., "Deep Compressed Sensing," arXiv:1905.06723v2 [cs.LG], May 18, 2019, 11 pages.
Wu, S. et al., "Learning a Compressed Sensing Measurement Matrix via Gradient Unrolling," arXiv:1806.10175v4 [stat.MIL], Jul. 2, 2019, 17 pages.
Xie, J. et al., "Image Denoising and Inpainting with Deep Neural Networks", Advances in Neural Information Processing Systems (NIPS 2012), 2012, vol. 25, 9 pages.
Xie, R. et al., "Transmission Efficient Clustering Method for Wireless Sensor Networks using Compressive Sensing," IEEE Transactions on Parallel and Distributed Systems, vol. 25, Issue 3, Mar. 2014, IEEE, 11 pages.
Xu, K. et al., "A Data-Driven Compressive Sensing Framework Tailored for Energy-Efficient Wearable Sensing," The 42nd IEEE International Conference on Acoustics, Speech and Signal Processing (ICASSP), Mar. 2017, IEEE, 6 pages.
Xu, K. et al., "An energy-efficient compressive sensing framework incorporating online dictionary learning for long-term wireless health monitoring", 2016 IEEE International Conference on Acoustics, Speech and Signal Processing (ICASSP) (Shanghai, China, Mar. 20-25, 2016), 2016 [Date Added to IEEE Xplore: May 2016], pp. 804-808 <DOI:10.1109/ICASSP.2016.7471786>.
Xu, K. et al., "CSVideoNet: A Real-Time End-to-End Learning Framework for High-Frame-Rate Video Compressive Sensing", 2018 IEEE Winter Conference on Applications of Computer Vision (WACV) (Lake Tahoe, NV, Mar. 12-15, 2018), 2018 [Date Added to IEEE Xplore: May 2018], pp. 1680-1688 <DOI:10.1109/WACV.2018.00187>.
Xu, K. et al., "CSVideoNet: A Real-Time End-to-End Learning Framework for High-Frame-Rate Video Compressive Sensing", Researchgate, May 2017 (uploaded Apr. 2017), 11 pages <https://www.researchgate.net/publication/315783235_CSVideoNet_A_Real-time_End-to-end_Learning_Framework_for_High-frame-rate_Video_Compressive_Sensing>.
Xu, K. et al., "CSVideoNet: A Real-time End-to-end Learning Framework for High-frame-rate Video Compressive Sensing", arXiv, (v3, submitted Mar. 20, 2017), 11 pages, arXiv:1612.05203v3.

(56) References Cited

OTHER PUBLICATIONS

Xu, K. et al., "CSVideoNet: A Real-time End-to-end Learning Framework for High-frame-rate Video Compressive Sensing", arXiv, (v4, submitted Apr. 5, 2017), 11 pages, arXiv:1612.05203v4.
Xu, K. et al., "CSVideoNet: A Real-time End-to-end Learning Framework for High-frame-rate Video Compressive Sensing", arXiv, (v5, submitted Jan. 28, 2018), 9 pages, arXiv:1612.05203v5.
Xu, K. et al., "CSVideoNet: A Recurrent Convolutional Neural Network for Compressive Sensing Video Reconstruction", arXiv, (v1, submitted Dec. 15, 2016), 10 pages, arXiv:1612.05203v1.
Xu, K. et al., "CSVideoNet: A Recurrent Convolutional Neural Network for Compressive Sensing Video Reconstruction", arXiv, (v2, submitted Dec. 16, 2016), 10 pages, arXiv:1612.05203v2.
Xu, K. et al., "LAPRAN: A Scalable Laplacian Pyramid Reconstructive Adversarial Network for Flexible Compressive Sensing Reconstruction", European Conference on Computer Vision 2018 (Munich, Germany, Sep. 8-14, 2018), Oct. 2018, vol. 11214, pp. 491-507 <DOI:10.1007/978-3-030-01249-6_30>.
Xu, K. et al., "LAPRAN: A Scalable Laplacian Pyramid Reconstructive Adversarial Network for Flexible Compressive Sensing Reconstruction", arXiv, (v1, submitted Jul. 24, 2018), 16 pages, arXiv:1807.09388v1.
Xu, K. et al., "LAPRAN: A Scalable Laplacian Pyramid Reconstructive Adversarial Network for Flexible Compressive Sensing Reconstruction", arXiv, (v2, submitted Jul. 28, 2018), 16 pages, arXiv:1807.09388v2.
Xu, K. et al., "LAPRAN: A Scalable Laplacian Pyramid Reconstructive Adversarial Network for Flexible Compressive Sensing Reconstruction", arXiv, (v3, submitted Nov. 28, 2018), 17 pages, arXiv:1807.09388v3.
Xu, K. et al., "Show, Attend and Tell: Neural Image Caption Generation with Visual Attention," Proceedings of the 32nd International Conference on Machine Learning, 2015, Lille, France, 10 pages.
Yang, J. et al., "Image Super-Resolution Via Sparse Representation," IEEE Transactions on Image Processing, vol. 19, No. 11, Nov. 2010, IEEE, pp. 2861-2873.
Yang, J. et al., "Video Compressive Sensing Using Gaussian Mixture Models," IEEE Transactions on Image Processing, vol. 23, No. 11, Nov. 2014, pp. 4863-4878.
Yang, Y. et al., "Deep ADMM-Net for Compressive Sensing MRI," 30th Conference on Neural Information Processing Systems (NIPS 2016), Dec. 2016, Barcelona, Spain, pp. 10-18.
Yang, Z. et al., "Stacked Attention Networks for Image Question Answering", 2016 IEEE Conference on Computer Vision and Pattern Recognition (Las Vegas, NV, Jun. 27-30, 2016), 2016 [Date Added to IEEE Xplore: Dec. 2016], pp. 21-29 <DOI:10.1109/CVPR.2016.10>.
Yao, H. et al., "DR 2-Net: Deep Residual Reconstruction Network for image compressive sensing," Neurocomputing, vol. 359, No. 11, Jun. 2019, Elsevier B.V., pp. 483-493.
Yuan, X. et al., "Parallel lensless compressive imaging via deep convolutional neural networks," Optics Express, vol. 26, No. 2, Jan. 22, 2018, Optical Society of America, 16 pages.
Zeiler, M. et al., "Adaptive Deconvolutional Networks for Mid and High Level Feature Learning," 2011 IEEE International Conference on Computer Vision (ICCV), Nov. 6-13, 2011, Barcelona, Spain, IEEE, 8 pages.
Zeiler, M. et al., "Visualizing and Understanding Convolutional Networks," In Fleet et al., ECCV 2014, Part I, LNCS 8689, Springer International Publishing, pp. 818-833.
Zeyde, R. et al., "On Single Image Scale-Up Using Sparse-Representations," In Boissonnat, J.D. et al., Curves and Surfaces 2011, LNCS 6920, 2012, Springer-Veriag, pp. 711-730.
Zhang, Z. et al.,"ISTA-Net: Interpretable Optimization-Inspired Deep Network for Image Compressive Sensing," 2018 IEEE/CVF Conference on Computer Vision and Pattern Recognition, Jun. 18-23, 2018, Salt Lake City, UT, USA, IEEE, pp. 1828-1837.
Zhao, W. et al., "On-Chip Neural Data Compression Based on Compressed Sensing With Sparse Sensing Matrices," IEEE Transactions on Biomedical Circuits and Systems, vol. 12, No. 1, Feb. 2018, IEEE, pp. 242-254.
Zuo, Z. et al., "Learning Contextual Dependence with Convolutional Hierarchical Recurrent Neural Networks," Jul. 2016, IEEE Transactions on Image Processing, vol. 25, No. 7, pp. 2983-2996.
Non-Final Office Action for U.S. Appl. No. 16/165,568, dated Mar. 18, 2020, 15 pages.
Applicant-Initiated Interview Summary for U.S. Appl. No. 16/165,568, dated Jun. 8, 2020, 3 pages.
Notice of Allowance for U.S. Appl. No. 16/165,568, dated Oct. 5, 2020, 9 pages.
Hong, T. et al., "Optimized structured sparse sensing matrices for compressive sensing," Signal Processing, vol. 159, Jun. 2019, Elsevier, pp. 119-129.
Huijben, B.S. et al., "Deep Probabilistic Subsampling forTask-Adaptive Compressed Sensing," Eighth International Conference on Learning Representations (ICLR 2020), Apr. 26-May 1, 2020, 16 pages.
Huggins, P.S. et al., "Greedy Basis Pursuit," IEEE Transactions on Signal Processing, vol. 55, No. 7, Jul. 2007, IEEE, pp. 3760-3772.
Iliadis, M. et al., "Deep Fully-Connected Networks for Video Compressive Sensing", arXiv, (v1, submitted Mar. 16, 2016), 13 pages, arXiv:1603.04930v1.
Iliadis, M. et al., "Deep fully-connected networks for video compressive sensing," Digital Signal Processing, vol. 72, Jan. 2018, Elsevier Inc., pp. 9-18.
Ioffe, S. et al., "Batch Normalization: Accelerating Deep Network Training by Reducing Internal Covariate Shift," Proceedings of the 32nd International Conference on Machine Learning, 2015, Lille, France, 9 pages.
Karpathy, A. et al., "Large-Scale Video Classification with Convolutional Neural Networks", 2014 IEEE Conference on Computer Vision and Patter Recognition (Columbus, OH, Jun. 23-28, 2014), 2014 [Date Added to IEEE Xplore: Sep. 2014], pp. 1725-1732 <DOI:10.1109/CVPR.2014.223>.
Kim, J. et al., "Accurate Image Super-Resolution Using Very Deep Convolutional Networks," 2016 IEEE Conference an Computer Vision and Pattern Recognition (CVPR), Jun. 27-30, 2016, Las Vegas, NV, USA, IEEE, pp. 1646-1654.
Kin, C., et al., "Video Compression Using Recurrent Convolutional Neural Networks," 2017, available at http://cs231n.stanford.edu/reports/2017/pdfs/423.pdf, 6 pages.
Kingma, D. et al., "Adam: A Method for Stochastic Optimization," arXiv: 1412.6980v9, Jan. 30, 2017, published as a conference paper at ICLR 2015, 15 pages.
Krizhevsky, A. et al., "ImageNet Classification with Deep Convolutional Neural Networks", Advances in Neural Information Processing Systems (NIPS 2012), 2012, vol. 25, 9 pages.
Krizhevsky, A., "Learning Multiple Layers of Features from Tiny Images," Apr. 8, 2009, available online at https://www.cs.toronto.edu/~kriz/learning-features-2009-TR.pdf, 60 pages.
Kulkarni, K. et al., "ReconNet: Non-Iterative Reconstruction of Images from Compressively Sensed Measurements," 2016 IEEE Conference on Computer Vision and Pattern Recognition (CVPR), Jun. 2016, IEEE, 10 pages.
Lai, W.S. et al., "Deep Laplacian Pyramid Networks for Fast and Accurate Super-Resolution," 2017 IEEE Conference on Computer Vision and Pattern Recognition (CVPR), Jul. 21-26, 2017, Honolulu, HI, USA, IEEE, pp. 5835-5843.
Lecun, Y. et al., "Efficient BackProp," In Montavon, G. et al., Neural Networks: Tricks of the Trade, 2nd edition, LNCS 7700, 2012, Springer-Verlag, pp. 9-48.
Leinonen, M. et al., "Distributed Variable-Rate Quantized Compressed Sensing in Wireless Sensor Networks," IEEE 17th International Workshop on Signal Processing Advances in Wireless Communications (SPAWC), Jul. 3-6, 2016, Edinburgh, United Kingdom, IEEE, 5 pages.
Li, C. et al., "An efficient augmented Lagrangian method with applications to total variation minimization," Computational Optimization and Applications, vol. 56, Issue 3, Dec. 2013, Springer Science+Business Media, 24 pages.

(56) References Cited

OTHER PUBLICATIONS

Li, D. et al., "DeepRebirth: Accelerating Deep Neural Network Execution on Mobile Devices," The Thirty-Second AAAI Conference on Artificial Intelligence (AAAI-18), 2018, Association for the Advancement of Artificial Intelligence, pp. 2322-2330.
Li, D. et al., "DeepRebirth: Accelerating Deep Neural Network Execution on Mobile Devices", arXiv, (v1, submitted Aug. 16, 2017), 9 pages, https://arxiv.org/abs/1708.04728v1.
Lohit, S. et al., "Convolutional Neural Networks for Noniterative Reconstruction of Compressively Sensed Images," IEEE Transactions on Computational Imaging, vol. 4, No. 3, Sep. 2018, IEEE, pp. 326-340.
Lohit, S. et al., "Rate-Adaptive Neural Networks forSpatial Multiplexers," arXiv:1809.02850v1 [cs.CV], Sep. 8, 2018, 12 pages.
Long, J. et al., "Fully Convolutional Networks for Semantic Segmentation", arXiv, (v1, submitted Nov. 14, 2014), 10 pages, arXiv:1411.4038v1.
Long, J. et al., "Fully Convolutional Networks for Semantic Segmentation", arXiv, (v2, submitted Mar. 8, 2015), 10 pages, arXiv:1411.4038.
Ma, S. et al., "An Efficient Algorithm for Compressed MR Imaging using Total Variation and Wavelets," IEEE Conference on Computer Vision and Pattern Recognition (CVPR), Jun. 23-28, 2008, Anchorage, AK, USA, 8 pages.
Ma, S. et al., "Learning Activity Progression in LSTMs for Activity Detection and Early Detection", 2016 IEEE Conference on Computer Vision and Pattern Recognition (Las Vegas, NV, Jun. 27-30, 2016), 2016 [Date Added to IEEE Xplore: Dec. 2016], pp. 1942-1950 <DOI:10.1109/CVPR.2016.214>.
Metzler, C.A. et al., "From Denoising to Compressed Sensing," IEEE Transactions on Information Theory, vol. 32, No. 9, Sep. 2016, IEEE, pp. 5117-5144.
Metzler, C.A., "Learned D-AMP: Principled Neural Network Based Compressive Image Recovery," 31st Conference on Neural Information Processing Systems (NIPS 2017), Dec. 4-9, 2017, Long Beach, CA, USA, 12 pages.
Mousavi, A. et al., "DeepCodec: Adaptive Sensing and Recovery via Deep Convolutional Neural Networks," arXiv:1707.03386v1 [stat.ML], Jul. 11, 2017, 8 pages.
Mousavi, A. et al., "A Data-Driven and Distributed Approach to Sparse Signal Representation and Recovery," 7th International Conference on Learning Representations (ICLR 2019), May 6-9, 2019, New Orleans, LA, USA, 13 pages.
Mousavi, A. et al., "A Deep Learning Approach to Structured Signal Recovery," arXiv: 1508.04065v1, Aug. 17, 2015, 8 pages.
Mousavi, A. et al., "Learning to Invert: Signal Recovery via Deep Convolutional Networks," 2017 IEEE International Conference on Acoustics, Speech and Signal Processing (ICASSP), Mar. 5-9, 2017, New Orleans, LA, USA, IEEE, pp. 2272-2276.
Mun, S. et al., "Motion-Compensated Compressed-Sensing Reconstruction for Dynamic MRI", 2013 IEEE International Conference on Image Processing (Melbourne, Australia, Sep. 15-18, 2013), 2013 [Date Added to IEEE Xplore: Feb. 2014], pp. 1006-1010 <DOI:10.1109/ICIP.2013.6738208>.
Nam, S. et al., "The cosparse analysis model and algorithms," Applied and Computational Harmonic Analysis, vol. 34, Issue 1, Jan. 2013, Elsevier Inc., pp. 30-56.
Needell, D. et al., "CoSaMP: Iterative Signal Recovery from Incomplete and Inaccurate Samples," Communications of the ACM, vol. 53, No. 12, Dec. 2010, pp. 93-100.
Ng, J. et al., "Beyong Short Snippets: Deep Networks for Video Classification", 2015 IEEE Conference on Computer Vision on Pattern Recognition (Boston, MA, Jun. 7-12, 2015), 2015 [Date Added to IEEE Xplore: Oct. 2015], pp. 4694-4702 <DOI:10.1109/CVPR.2015.7299101>.
Nguyen, D. et al., "Deep Learning Sparse Ternary Projections for Compressed Sensing of Images," 2017 IEEE Global Conference on Signal and Information Processing (GlobalSIP), Nov. 14-16, 2017, Montreal, QC, Canada, IEEE, pp. 1125-1129.
Noh, H. et al., "Image Question Answering Using Convolutional Neural Network with Dynamic Parameter Prediction", 2016 IEEE Conference on Computer Vision and Pattern Recognition (Las Vegas, NV, Jun. 27-30, 2016), 2016 [Date Added to IEEE Xplore: Dec. 2016], pp. 30-38 <DOI:10.1109/CVPR.2016.11>.
Noh, H. et al., "Learning Deconvolution Network for Semantic Segmentation," IEEE International Conference on Computer Vision (ICCV), 2015, IEEE, pp. 1520-1528.
Oquab, M. et al., Is Object Localization for Free?—Weakly-Supervised Learning with Convolutional Neural Networks, 2015 IEEE Conference on Computer Vision and Pattern Recognition (Boston, MA, Jun. 7-12, 2015), 2015 [Date Added to IEEE Xplore: Oct. 2015], pp. 685-694 <DOI:10.1109/CVPR.2015.7298668>.
Pathak, D. et al., "Context Encoders: Feature Learning by Inpainting," 2016 IEEE Conference on Computer Vision and Pattern Recognition (CVPR), Jun. 27-30, 2016, Las Vegas, NV, USA, IEEE, pp. 2536-2544.
Pan, P. et al., "Hierarchical Recurrenet Neural Encoder for Video Representation with Application to Captioning," Nov. 2015, available at https://arxiv.org/abs/1511.03476, 10 pages.
Paszke, A. et al., "Automatic differentiation in PyTorch," 31st Conference on Neural Information Processing Systems (NIPS 2017), Dec. 4-9, 2017, Long Beach, CA, USA, 4 pages.
Qaisar, S. et al., "Compressive Sensing: From Theory to Applications, a Survey", Journal of Communications and Networks, Oct. 2013 (Date of Publication Nov. 2013), vol. 15, No. 5, pp. 443-456 <DOI:10.1109/JCN.2013.000083>.
Radford, A. et al., "Unsupervised Representation Learning with Deep Convolutional Generative Adversarial Networks," arXiv: 1511.06434v2, Jan. 7, 2016, 16 pages.
Safavi, S. et al., "Sparsity-aware adaptive block-basedcompressive sensing," IET Signal Processing, Jul. 2016, The Institution of Engineering and Technology, 7 pages.
Sankaranarayanan, A. et al., "Compressive Acquisition of Linear Dynamical Systems," SIAM Journal on Imaging Sciences, vol. 6, No. 4, 2013, Society for Industrial and Applied Mathematics, pp. 2109-2133.
Sankaranarayanan, A. et al., "CS-MUVI: Video Compressive Sensing for Spatial-Multiplexing Cameras", 2012 IEEE International Conference on Computational Photography (Seattle, WA, Apr. 28-29, 2012), 2012 [Date Added to IEEE Xplore: Jun. 2012], 10 pages <DOI:10.1109/ICCPhot.2012.6215212>.
Sankaranarayanan, A. et al., "Video Compressive Sensing for Spatial Multiplexing Cameras Using Motion-Flow Models," SIAM Journal on Imaging Sciences, vol. 8, No. 3, 2015, Society for Industrial and Applied Mathematics, pp. 1489-1518.
Schulter, S. et al., "Fast and Accurate Image Upscaling with Super-Resolution Forests," 2015 IEEE Conference on Computer Vision and Pattern Recognition (CVPR), Jun. 7-12, 2015, Boston, MA, USA, IEEE, pp. 3791-3799.
Sharma, S. et al., "Action Recognition using Visual Attention", arXiv, (v1, submitted Nov. 12, 2015), 11 pages, arXiv:1511.04119v1.

\* cited by examiner

SELECTIVE SENSING: A DATA-DRIVEN NONUNIFORM SUBSAMPLING APPROACH FOR COMPUTATION-FREE ON-SENSOR DATA DIMENSIONALITY REDUCTION

RELATED APPLICATIONS

This application claims the benefit of provisional patent application Ser. No. 63/022,735, filed May 11, 2020, the disclosure of which is hereby incorporated herein by reference in its entirety.

GOVERNMENT SUPPORT

This invention was made with government support under 1652038 awarded by the National Science Foundation. The government has certain rights in the invention.

FIELD OF THE DISCLOSURE

The present disclosure relates to subsampling of signals, such as images.

BACKGROUND

While the internet-of-things (IoT) revolution brings unprecedented opportunities for economic growth and societal benefits, it also presents emergent challenges to existing computational infrastructures. For example, cloud computing is projected to fall short by two orders of magnitude to either transfer, store, or process such a vast amount of streaming data. Furthermore, the cloud fails to provide timely service for many time-sensitive IoT applications. Consequently, the consensus in the industry is to expand computational infrastructures from data centers toward the network edge. Over the next decade, a vast amount of computation and storage resources will be deployed to the proximity of IoT devices—a paradigm referred to as "edge computing".

Nonetheless, the emergent IoT data explosion will inevitably exert a tremendous data transmission burden onto the wireless edge networks, which are often low-power wide-area networks (LPWAN) with very limited bandwidth. Thus, improving the bandwidth efficiency of wireless edge networks will be of great importance to future edge computing infrastructure and many emerging IoT applications. This indicates that a generic on-sensor data compression solution for reducing data size for wireless transmission is key to improving the efficiency of bandwidth usage for wireless edge networks.

As most IoT sensors are used to sample signals at a low frequency (<1 kilohertz (KHz)), the energy efficiency of such systems is dominated by the energy consumption of radio frequency (RF) transceivers for wireless communication rather than analog-to-digital converters (ADCs). For instance, state-of-the-art radio transmitters for bio-sensing applications exhibit energy cost in the nanojoule (nJ)/bit range while ADCs only consume 10 picojoules (pJ)/bit at most. This indicates that a generic on-sensor data compression solution for reducing data size for wireless transmission is also key to saving energy on IoT sensors.

Thus, efficient information acquisition techniques that precisely sense signal information of interest are greatly needed. Compressive sensing is a generic solution for sensing signals in a compressed format. While the compressive sensing of specific types of signals (e.g., images) can be implemented directly in the analog domain, many application scenarios require implementation of data compression in the digital domain. Such a digital-domain implementation (i.e., linear transformation of signals) of compressive sensing is often computationally costly, especially when the signal data rate (signal dimension n and/or sampling rate) is high and/or a data-driven sensing matrix is used.

To mitigate this problem, several approaches have been proposed to reduce the computational complexity of compressive sensing by constraining the sensing matrices to be sparse, binary, or ternary. While these approaches can reduce the computational complexity by a constant factor ($O(n^2)$), where c can be as low as $10^{-2}$), such reduced computational complexity can be still too high to be affordable for resource-constrained sensor devices (e.g., low-cost IoT sensors) or high-data-rate sensor devices (e.g., high-frame-rate camera or LiDAR). Other approaches propose to implement compressive sensing in the analog domain instead, eliminating or reducing the computation cost of compressive sensing through custom hardware implementation. However, such custom hardware implementations inevitably increase the cost of the sensor and is often specific to the sensor design, and thereby cannot be generally applied to other sensors or applications.

SUMMARY

A data-driven nonuniform subsampling approach for computation-free on-sensor data dimensionality is provided, referred to herein as selective sensing. Designing an on-sensor data dimensionality reduction scheme for efficient signal sensing has long been a challenging task. Compressive sensing is a generic solution for sensing signals in a compressed format. Although compressive sensing can be directly implemented in the analog domain for specific types of signals, many application scenarios require implementation of data compression in the digital domain. However, the computational complexity involved in digital-domain compressive sensing limits its practical application, especially in resource-constrained sensor devices or high-data-rate sensor devices. Embodiments described herein provide a selective sensing framework that adopts a novel concept of data-driven nonuniform subsampling to reduce the dimensionality of acquired signals while retaining the information of interest in a computation-free fashion.

Selective sensing adopts a co-optimization methodology to co-train a selective sensing operator with a subsequent information decoding neural network. This approach provides information-aware sensing, which provides a subsampling of a sensed signal which is relevant to a subsequent signal analysis (e.g., reconstruction or inference) performed by the neural network. Embodiments provide on-sensor reduction of data dimensionality without a need for significant processing resources, which can improve power consumption, sensed signal bandwidth, and cost of many sensors.

An exemplary embodiment provides a method for selectively sensing a signal of interest. The method includes applying an information-aware subsampling of a signal of interest to produce a selectively sensed signal, wherein the information-aware subsampling is based on a selection index pretrained for a particular information processing task to be performed on the selectively sensed signal.

Another exemplary embodiment provides a sensor device. The sensor device includes a sensor; and a controller coupled to the sensor and configured to: apply an information-aware subsampling to sensor data from the sensor to produce a selectively sensed signal, wherein the information-aware subsampling is based on a selection index pretrained for a particular information processing task to be performed on the selectively sensed signal.

Another exemplary embodiment provides a signal processing system. The signal processing system includes a sensor; and a controller coupled to the sensor and in communication with a signal processor, wherein the controller is configured to: apply an information-aware subsampling to sensor data from the sensor to produce a selectively sensed signal; and provide the selectively sensed signal to a signal processor implementing a neural network model, wherein the information-aware subsampling is based on a selection index co-trained with the neural network model.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
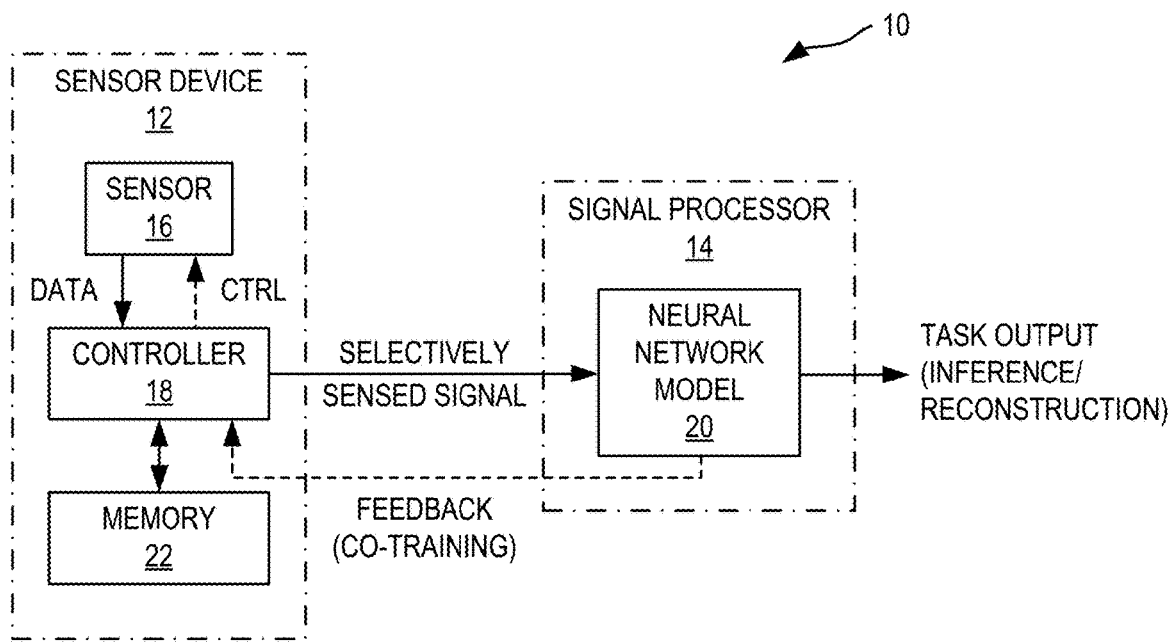
FIG. 1 is a schematic block diagram of a signal processing system implementing selective sensing according to embodiments described herein.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A data-driven nonuniform subsampling approach for computation-free on-sensor data dimensionality is provided, referred to herein as selective sensing. Designing an on-sensor data dimensionality reduction scheme for efficient signal sensing has long been a challenging task. Compressive sensing is a generic solution for sensing signals in a compressed format. Although compressive sensing can be directly implemented in the analog domain for specific types of signals, many application scenarios require implementation of data compression in the digital domain. However, the computational complexity involved in digital-domain compressive sensing limits its practical application, especially in resource-constrained sensor devices or high-data-rate sensor devices. Embodiments described herein provide a selective sensing framework that adopts a novel concept of data-driven nonuniform subsampling to reduce the dimensionality of acquired signals while retaining the information of interest in a computation-free fashion.

Selective sensing adopts a co-optimization methodology to co-train a selective sensing operator with a subsequent information decoding neural network. This approach provides information-aware sensing, which provides a subsampling of a sensed signal which is relevant to a subsequent signal analysis (e.g., reconstruction or inference) performed by the neural network. Embodiments provide on-sensor reduction of data dimensionality without a need for significant processing resources, which can improve power consumption, sensed signal bandwidth, and cost of many sensors.

I. INTRODUCTION

The present disclosure proposes a selective sensing framework to address the limitations of compressive sensing by adopting the novel concept of data-driven nonuniform subsampling to reduce the dimensionality of acquired signals while retaining the information of interest in a computation-free fashion. Specifically, the data dimensionality reduction in selective sensing is a nonuniform subsampling (or selection) process that simply selects the most informative entries of a digital signal (e.g., a vector, matrix, or multi-dimensional tensor) based on an optimized, stationary selection index (e.g., a lower dimension vector, matrix, or multi-dimensional tensor) informed by training data.

Since no computation is involved for any form of data encoding, the computational complexity of the selective sensing operator is simply O(1), leading to the computation-free data dimensionality reduction during the selective sensing process. Selective sensing adopts a co-optimization methodology to co-train a selective sensing operator with a subsequent information decoding neural network. As the trainable parameters of the sensing operator (the selection index) and the information decoding neural network are discrete- and continuous-valued, respectively, the co-optimization problem in selective sensing is a mixed discrete-continuous optimization problem that is inherently difficult to solve. A feasible solution to solve it is proposed, which transforms the mixed discrete-continuous optimization problem into two continuous optimization subproblems through interpolation and domain extension techniques. Both of the subproblems can then be efficiently solved using gradient-descent-based algorithms.

As a demonstrative example, the selective sensing approach is evaluated using images as the sensing modality and reconstruction as the information decoding task. Evaluations on CIFAR10, Set5, and Set14 datasets show that the selective sensing framework can achieve an average reconstruction accuracy improvement in terms of peak signal-to-noise ratio (PSNR)/structural similarity index measure (SSIM) by 3.73 decibels (dB)/0.07 and 9.43 dB/0.16 over compressive sensing and uniform subsampling counterparts across the dimensionality reduction ratios of 4-32×, respectively. It should be understood that selective sensing can be used with any sensing modality (e.g., image, video, 3-dimensional (3-D) mapping, radar, LiDAR, telecommunications signals, etc.) and information processing task. In some examples, the information processing task is a low-level processing task such as image reconstruction or signal reconstruction. In other examples, the information processing task is a high-level processing task such as object classification, detection, or segmentation.

Features and advantages of embodiments described herein are summarized as follows:

A new on-sensor data dimensionality reduction method—selective sensing—is proposed. Selective sensing efficiently reduces the dimensionality of acquired signals in a computation-free fashion while retaining information of interest. The computation-free nature of selective sensing makes it a highly suitable solution for performing on-sensor data dimensionality reduction on resource-constrained sensor devices or high-data-rate sensor devices dealing with high-dimensional signals.

A novel concept of data-driven nonuniform subsampling is proposed and explored. Specifically, the problem of co-optimizing a selective sensing operator with a subsequent information decoding neural network is first formulated as a mixed discrete-continuous optimization problem. Furthermore, a viable solution is proposed that transforms the problem into two continuous optimization subproblems that can be efficiently solved by gradient-descent-based algorithms, which makes the co-training feasible.

It is shown empirically that data-driven non-uniform subsampling can well preserve signal information under the presence of a co-trained information decoding network.

II. METHODOLOGY

This section formulates the co-optimization of a selective sensing operator and a subsequent information decoding network (e.g., a neural network performing a particular information processing task) as a mixed discrete-continuous optimization problem. Then, by applying continuous interpolation and domain extension on the integer variables, the mixed discrete-continuous optimization problem is reformulated into two continuous optimization problems, both of which can be solved by conventional gradient-descent-based algorithms. Based on the new formulation, the conventional backpropagation (BP) algorithm is extended to derive a general co-training algorithm to co-optimize a selective sensing operator and a subsequent information decoding network. At last, by taking images as an exemplary sensing modality and using reconstruction as an exemplary information decoding task, a practical approach, referred to as SS+Net, is proposed to compose a selective sensing framework for image selective sensing and reconstruction.

In this disclosure, a lowercase letter denotes a scalar or a scalar-valued function, and an uppercase letter denotes a vector, a matrix, a tensor, or a vector-valued function. Brackets are used to index the element of a vector, a matrix, or a tensor. For example, assume X denotes an n-dimensional vector $X=[x_0, \ldots, x_{n-1}]$, then $X[i]=x_i$ for $i=0, \ldots, n-1$.

A. Problem Formulation

Consider the original signal X is an n-dimensional vector, the subsampling rate is $$\frac{m}{n},$$

and the subsampled measurement Y is an m-dimensional vector. The selective sensing of X is a data-driven nonuniform subsampling or a selection process that can be formulated as:

$$Y=S(X,I)=[X[I[0]], \ldots, X[I[m-1]]] \quad \text{Equation 1}$$

where S(X,I) is a function that stands for the selective sensing operator. I is an m-dimensional vector denoting the selection set, which contains the indices (integer values between 0 and n−1) of the elements to be selected.

Benefiting from the data-driven nature, selective sensing can be seamlessly combined (through co-training) with any information decoding tasks at the subsequent stage, including but not limited to reconstruction, classification, detection, etc. Consider $N(Y,\Theta)$ to be a subsequent information decoding network and $\Theta$ to be the trainable parameters. o is a differentiable objective function that measures the information loss throughout the entire selective sensing process with respect to an information acquisition task. For instance, in a signal reconstruction task, the objective function can be defined as a loss function which measures the difference between the reconstructed signal and the original signal. The co-optimization problem of the sensing operator S and the information decoding network N can be reformulated as:

$$I_{opt}, \Theta_{opt} = \underset{I,\Theta}{\mathrm{argmin}}\ o(N(S(X, I), \Theta)) \qquad \text{Equation 2}$$

subject to $i_0, \ldots, i_{m-1}$ being integers within interval $[0, n-1]$.

Given the entries of $\Theta$ are continuous variables, and the entries of I are constrained to be integer variables within $[0, n-1]$, the problem in Equation 2 is a mixed discrete-continuous optimization problem that cannot be directly solved using conventional gradient-descent based algorithms. This is because the gradient of o with respect to I does not exist.

B. Reformulation with Continuous Interpolation and Domain Extension

By applying the continuous interpolation on S with respect to I and the extension on the domain of S, the problem in Equation 2 can be reformulated into two subproblems. For simplicity, a linear interpolation of I is adopted herein. However, nonlinear interpolation methods can be also applied.

A piece-wise linear interpolation function $f(X,i)$ is defined as:

$$f(X,i)=(X[r_u]-X[r_d])(i-i_d)+X[r_d] \qquad \text{Equation 3}$$

where $i_u$=floor(i)+1, $i_d$=floor(i), $r_u$=$i_u$ mod n, and $r_d$=$i_d$ mod n.

In Equation 3, i is a real-valued scalar, floor( ) is the flooring function returning the closest integer that is less than or equal to the input, and mod is the modulo operation. $f(X,i)$ essentially interpolates the value of X over a continuous index i in a piece-wise linear fashion and extends the range of i to $(-\infty, \infty)$. Given an X, $f(X,i)$ is periodic over every n-length interval of i. At integer values of i, $f(X,i)=X[i \bmod n]$ returns the original value of the [i mod n]-th element of X. Specifically, when i is an integer in interval $[0, n-1]$, $f(X,i)=X[i]$. Due to the continuous interpolation, $f(X,i)$ is almost everywhere differentiable over i except for all the integer points.

The choice of the gradient value at integer points turns out to be insensitive to the algorithm performance. For simplicity, the derivatives of $f(X,i)$ at integer values of i are defined as zero. As such, the gradient value of $f$ with respect to i in the whole space can be expressed as:

$$\frac{\partial f}{\partial i} = \begin{cases} 0, & \text{if } i \text{ is an integer} \\ (X[r_u] - X[r_d]) & \text{otherwise} \end{cases} \qquad \text{Equation 4}$$

Based on Equation 4, a continuous selective sensing operator function S' is defined as:

$$S'(X,I)=[f(X,i_0), \ldots, f(X,i_{m-1})] \qquad \text{Equation 5}$$

Leveraging Equation 3 and Equation 5, the mixed discrete-continuous optimization problem in Equation 2 is reformulated into two subproblems defined as:

$$I_R, \Theta_R = \underset{I,\Theta}{\mathrm{argmin}}\ o(N(S'(X, I), \Theta)) \qquad \text{Equation 6}$$

and $$I_{opt} = [\mathrm{round}(i) \bmod n \text{ for each entry } i \text{ in } I_R], \qquad \text{Equation 7}$$
$$\Theta_{opt} = \underset{\Theta}{\mathrm{argmin}}\ o(N(S(X, I_{opt}), \Theta))$$

where round( ) is an even rounding function that returns the closest integer value of the input, and the initial values of $\Theta$ in Equation 7 are represented by $\Theta_R$. Note that both the subproblems in Equation 6 and Equation 7 are unconstrained and the gradient of o with respect to I and $\Theta$ can be calculated over the whole space in Equation 6. Therefore, the subproblems in Equation 6 and Equation 7 can be solved sequentially using gradient-descent based algorithms. For brevity of illustration, the processes of solving the subproblem in Equation 6 and Equation 7 are referred to as the initial-training and the fine-tuning step, respectively, throughout this disclosure.

C. Extension of the Backpropagation (BP) Algorithm

Generally, neural network models are trained over multiple training samples and the gradients of trainable parameters are calculated using the BP algorithm. The BP algorithm is extended and the gradient calculation (with respect to I) over a batch of training samples is derived as follows.

Given a batch of b samples $X_1, \ldots, X_b$ of the signal X for training, the forward pass of the BP algorithm in the initial-training step can be derived as:

$$Y_i = S'(X_i, I) \qquad \text{Equation 8}$$
$$Z_i = N(Y_i, \Theta)$$
$$o_i = o(Z_i)$$
$$o_{batch} = \frac{1}{b}\sum_{i=1}^{b} o_i$$

where i=1, b, $Z_i$ is the representation of the information decoded by the network, and $o_{batch}$ is the loss function that measures the average information loss throughout the selective sensing process. In some examples, the total information loss is used here.

In the backward pass of the BP algorithm, the gradient calculation with respect to $\Theta$ is the same as in regular neural network training. The gradient calculation with respect to I can be derived using the chain rule of derivative. Specifically, the gradient calculation of $o_{batch}$ with respect to $Y_i$ can be derived as:

$$\frac{\partial o_{batch}}{Y_i} = \frac{1}{b}\frac{\partial o_i}{Y_i} \text{ for } i = 1, \ldots, b \qquad \text{Equation 9}$$

Subsequently, the gradient calculation of $o_{batch}$ with respect to I over a batch of training samples can be derived as:

$$\frac{\partial o_{batch}}{\partial I} = \frac{1}{b}\sum_{j=1}^{b}\frac{\partial o_j}{\partial Y_j}\frac{\partial Y_j}{\partial I} = \left[\frac{1}{b}\sum_{j=1}^{b}\frac{\partial o_j}{\partial Y_j[0]}\frac{\partial f(X_j, I[0])}{\partial I[0]}, \cdots, \frac{1}{b}\sum_{j=1}^{b}\frac{\partial o_j}{\partial Y_j[m-1]}\frac{\partial f(X_j, I[m-1])}{\partial I[m-1]}\right]$$

Equation 10

Leveraging the gradient calculations in Equation 9 and Equation 10, the subproblem in Equation 6 can be therefore solved by using gradient decent-based algorithms. The outputs from the initial-training step include the optimized selection set $I_R$ and the corresponding reconstruction network parameters $\Theta_R$. As the entries of $I_R$ are continuous over interval $(-\infty, \infty)$, one needs further convert $I_R$ to an integer selection set $I_{opt}$ as shown in Equation 7. To compensate for the accuracy loss due to rounding, the reconstruction network shall be further fine-tuned in the fine-tuning step while keeping $I_{opt}$ fixed as shown in Equation 7.

The entire algorithm of co-training an information decoding network N and a selective sensing operator S is summarized in Algorithm 1.

---

Algorithm 1 Main algorithm

---

Input: training samples $X_1, \ldots, X_N$, number of iterations maxiters for initial-training step, batch size b
Initialize I, $\Theta$
Initial-training
for iter = 1 to maxiters do for batch = 1 to $\frac{N}{b}$ do Forward pass
      Execute Equation 8
      Backward pass
      Using the BP algorithm to calculate the gradient with respect to $\Theta$
      Execute Equation 9
      Execute Equation 10 to calculate the gradient with respect to I
      Optimize I and $\Theta$ using the calculated gradients
    end for
end for
$I_R, \Theta_R = I, \Theta$
Execute the rounding and modulo operations over entries of $I_R$ as in Equation 7 to get $I_{opt}$
Fine-tuning
Initialize $\Theta = \Theta_R$, further optimize $\Theta$ with the gradients calculated by the BP algorithm while keeping $I = I_{opt}$
End
$I_{opt}, \Theta_{opt} = I, \Theta$

---

D. Image Selective Sensing and Reconstruction

To evaluate the selective sensing approach, an exemplary embodiment takes an image as the sensing modality and reconstruction as the information decoding task. Neural network models can be trained to directly approximate the inverse mapping of compressive sensing to perform the reconstruction. Therefore, it is hypothesized that there exists a direct mapping from the selective sensed (nonuniformly subsampled) domain to the original image domain, and such a mapping can be well approximated by a neural network co-trained with the selective sensing operator. Furthermore, it is hypothesized that the existing image compressive sensing reconstruction networks can be also used for image selective sensing reconstruction. It should be understood that the image reconstruction task is used as an illustrative example, and other embodiments of selective sensing can be used for other sensing modalities and information decoding tasks.

Based on these hypotheses, the loss function $l(\hat{X}, X)$ is used as the objective function in Equation 2, where l is a function that measures the distance between $\hat{X}$ and X (e.g., a mean-square-error function) and $\hat{X}$ is the output (Z in Equation 8) of the information decoding network N. As such, N is trained to directly reconstruct the original image from the selective sensing measurement as $$X \xrightarrow[\text{Sensing}]{S'} Y \xrightarrow[\text{Reconstruction}]{N} \hat{X}$$

Image selective sensing and reconstruction networks composed in such a way are referred to herein as SS+Net.

To evaluate the performance of SS+Net, it is compared against compressive sensing and uniform subsampling counterparts referred to as CS+Net and US+Net, respectively. CS+Net and US+Net use same reconstruction networks but replace the selective sensing operator in SS+Net with a Gaussian random sensing matrix and a uniform subsampling operator, respectively. Additionally, all the hyperparameters in SS+Net, CS+Net, and US+Net are set to be the same during the training for a fair comparison. The purpose of using CS+Net and US+Net as the reference methods is to reveal the true impact of selective sensing on compressive information acquisition in comparison to the compressive sensing and uniform subsampling counterparts.

III. SIGNAL PROCESSING SYSTEM FOR SELECTIVE SENSING

FIG. 1 is a schematic block diagram of a signal processing system 10 implementing selective sensing according to embodiments described herein. The signal processing system 10 includes a sensor device 12 and a signal processor 14. The sensor device 12 performs an on-sensor reduction of dimensionality of captured data by applying information-aware subsampling in the digital domain to produce a selectively sensed signal. The selectively sensed signal includes sparse information (e.g., subsampled below raw sensor data, such as a sub-Nyquist sampling of the raw sensor data) which is relevant to a subsequent signal analysis (e.g., a signal reconstruction or inference analysis) by the signal processor 14.

In this regard, the sensor device 12 includes a sensor 16 which captures a signal of interest. The sensor 16 can be any type of electronic sensor, such as an image sensor, an environmental sensor (e.g., a thermal sensor, humidity sensor, motion sensor, and the like), an antenna array or other sensor to capture electromagnetic signals (e.g., terrestrial radio, millimeter wave (mmWave), optical, microwave, X-ray, etc.), etc. The raw sensor data provided by the sensor device 12 may be a single- or multi-channel signal (e.g., representing different color channels, different elements of a sensor array, etc.). Similarly, the selection index from which the selectively sensed signal is produced may be a single- or multi-channel selection index.

The sensor device 12 further includes a controller 18 which applies an information-aware subsampling to sensor data from the sensor 16 to produce the selectively sensed signal. The controller 18 applies the information-aware subsampling of the sensor data based on a selection index which is co-trained with a neural network model 20 implemented by the signal processor 14. The controller 18 is generally implemented on-chip with the sensor 16 to provide control of the sensor 16 and dimensionality reduction of the sensor data without need for significant on-chip signal processing resources in the sensor device 12.

In some embodiments, the controller 18 includes or is implemented as control logic which is configured to control elements of the sensor 16 to capture the selectively sensed signal according to the selection index. That is, the controller 18 may be implemented with other one or more logic devices (e.g., programmable or reconfigurable logic devices), discrete gate or transistor logic, discrete hardware components, or any combination thereof which cause the sensor 16 to apply the selection index as a subsampling mask of the sensor elements.

In some embodiments, the controller 18 is a microprocessor which receives raw sensor data from the sensor 16 and samples the raw sensor data to produce the selectively sampled signal in accordance with the selection index. That is, the controller 18 may be a microprocessor (e.g., a microcontroller, field programmable gate array (FPGA), a digital signal processor (DSP), an application-specific integrated circuit (ASIC), or other programmable logic device, a discrete gate or transistor logic, discrete hardware components, or any combination thereof) executing logic instructions to apply the selection index as a computation-free subsampling mask of the raw sensor data.

In this manner, the selective sensing approach described herein may enable production of low-cost and low-power sensor devices 12 by omitting on-chip signal processing while saving signal bandwidth and providing information useful to off-chip information processing tasks at the signal processor 14. The selective sensing approach may provide benefits to existing and future high-complexity sensor device 12 by reducing or eliminating the need to use on-chip signal processing during signal capture and transmission to the signal processor 14.

The signal processor 14 can be any appropriate signal processor or set of processors configured to implement the neural network model 20. For example, the signal processor 14 includes one or more commercially available or proprietary general-purpose or application-specific processing devices, such as a microprocessor, central processing unit (CPU), FPGA, DSP, ASIC, microcontroller, or combinations thereof. In some embodiments, the signal processor 14 is implemented in a common electronic device with the sensor device 12 (e.g., a computer, a mobile device, a wearable device, etc.) but in a separate chip connected by an appropriate signal interface. In some embodiments, the signal processor 14 is implemented remotely from the sensor device 12, such as at a network edge device, a cloud server, or the like.

As described above, the controller 18 implements the information-aware subsampling of sensor data based on a selection index which is co-trained with the neural network model 20 implemented on the signal processor 14. As such, during training the controller 18 provides the selectively sensed signal to the neural network model 20 (while receiving data from the sensor 16 and/or providing control signals to sensor elements of the sensor 16), and the neural network model 20 provides feedback to the controller 18 to iteratively or otherwise train the selection index to provide a subsampling most informative to the information task performed by the neural network model 20.

In some embodiments, the sensor device 12 is pre-trained to provide selective sensing for multiple information processing tasks and/or at multiple subsampling ratios. For example, the signal processor 14 may implement several neural network models 20 and/or request different subsampling ratios (e.g., dynamically at runtime), or the sensor device 12 may provide selective sensing to different signal processors 14 performing different information processing tasks, with different resource constraints, etc. Accordingly, the controller 18 may include or be coupled to a memory 22 storing multiple selection indexes which can reconfigure the sensor device 12 (e.g., dynamically at runtime) for another information processing task, different conditions (e.g., to adapt to different environmental conditions, such as light levels, signal environment, etc.), and/or different subsampling ratios.

Figure 2:
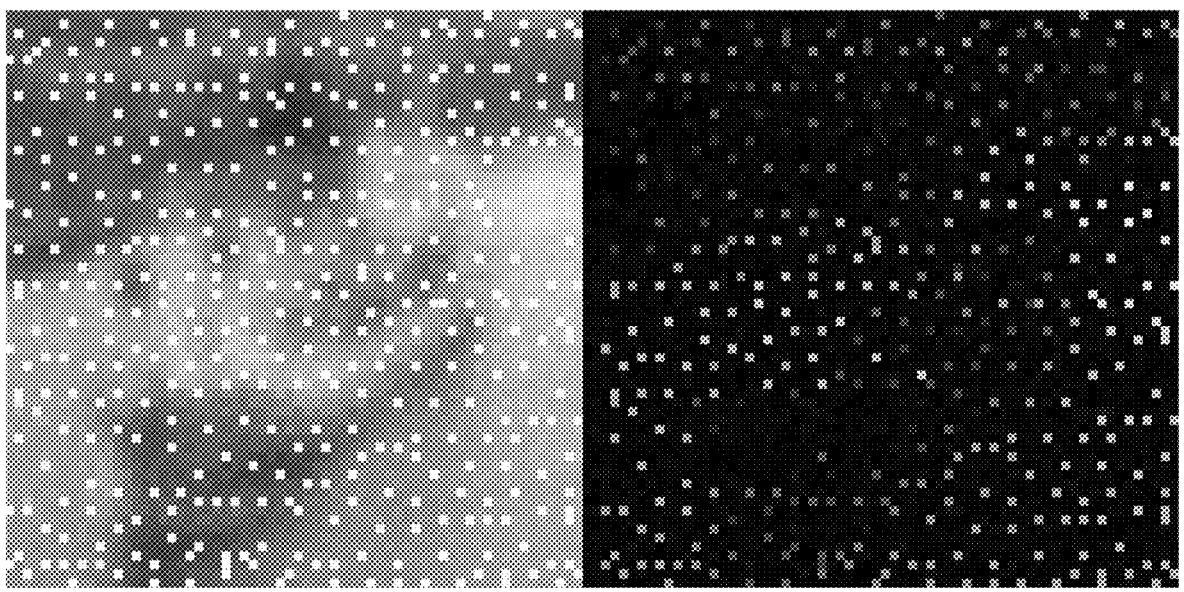
FIG. 2 is a pictorial representation of an imaging application of selective sensing.

FIG. 2 is a pictorial representation of an imaging application of selective sensing. The left side of FIG. 2 illustrates a pretrained selection index overlaid on a signal of interest, in this example an image. The right side of FIG. 2 illustrates corresponding values of a resulting selective sensing signal. In this example, the selective sensing signal has a subsampling rate of 0.03125.

Figure 3:
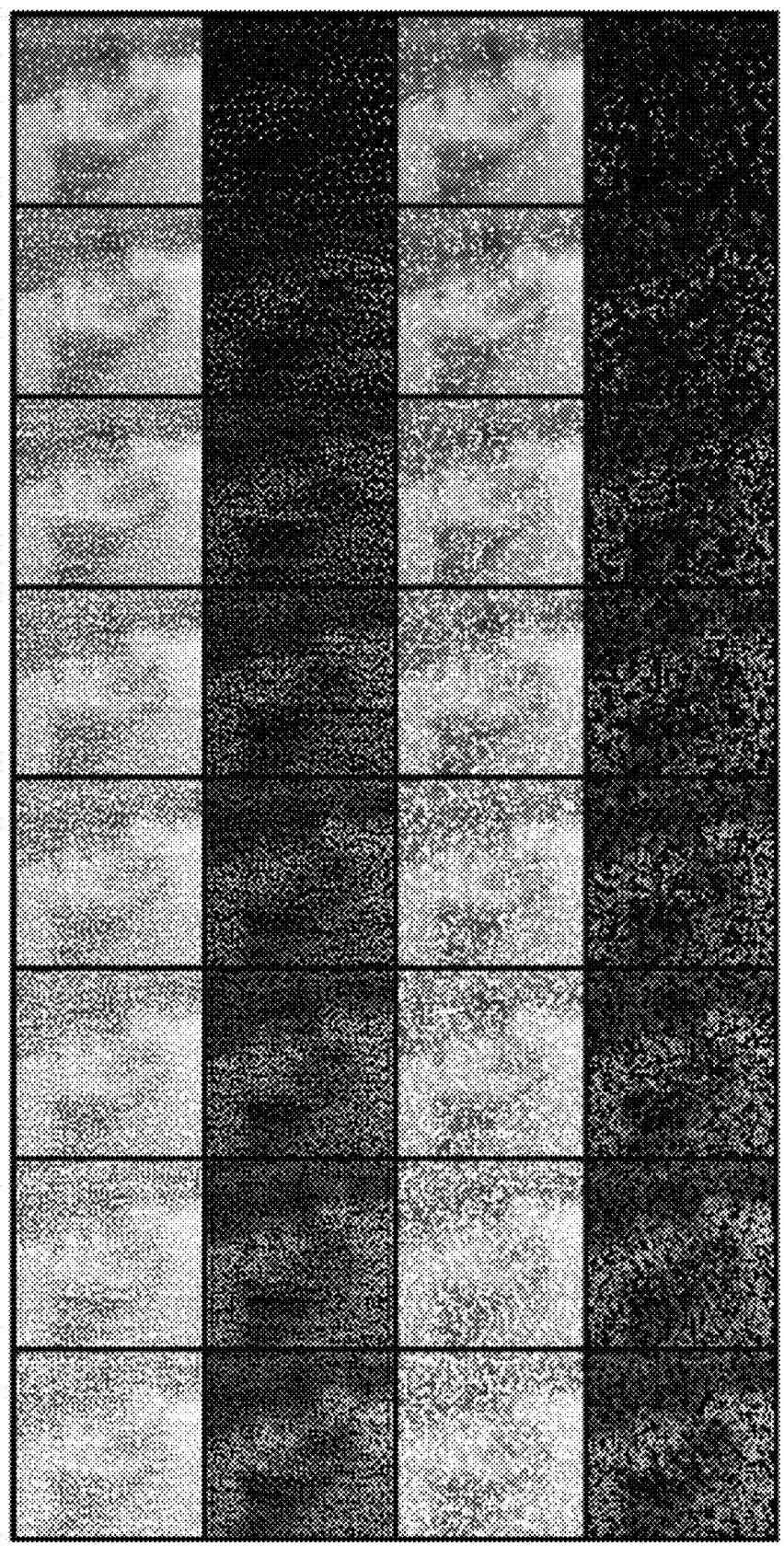
FIG. 3 illustrates a visual comparison between information-aware subsampling according to embodiments described herein and a random subsampling.

FIG. 3 illustrates a visual comparison between information-aware subsampling according to embodiments described herein and a random subsampling. From left to right, the columns illustrate information-aware selection indexes (overlaid on a sample image), selective sensing measurements, random selection masks, and random selection measurements. From top to bottom, the rows illustrate subsampling rates ranging from 0.03125 to 0.25.

Figure 4:
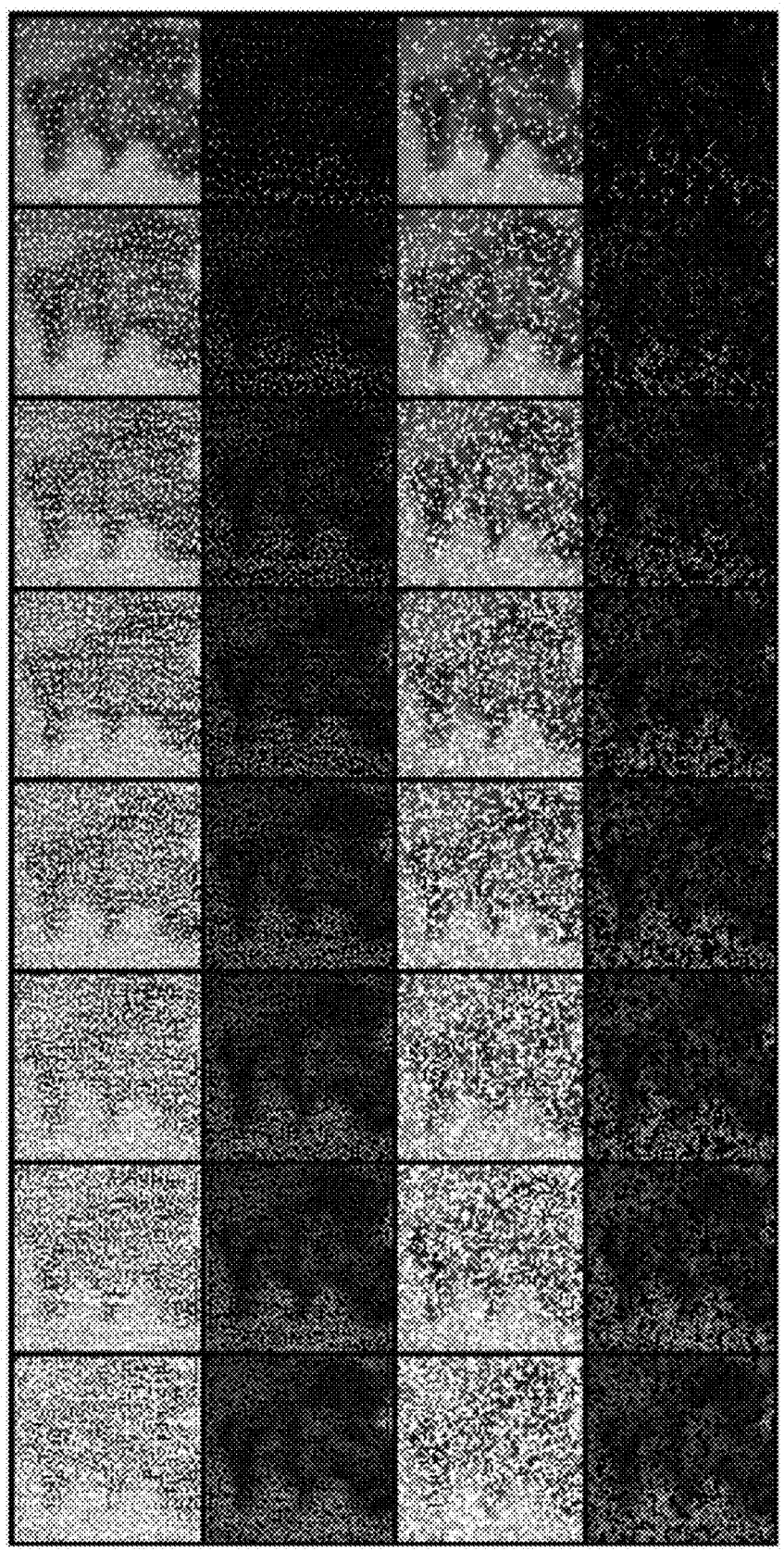
FIG. 4 illustrates another visual comparison between information-aware subsampling according to embodiments described herein and a random subsampling.

FIG. 4 illustrates another visual comparison between information-aware subsampling according to embodiments described herein and a random subsampling. From left to right, the columns illustrate information-aware selection indexes (overlaid on a sample image), selective sensing measurements, random selection masks, and random selection measurements. From top to bottom, the rows illustrate subsampling rates ranging from 0.03125 to 0.25.

IV. EVALUATION

A. Evaluation Setup

Evaluations are conducted on two datasets with two different reconstruction networks at measurement/subsampling rates ranging from 0.03125 to 0.25 (corresponding to the dimensionality reduction ratios of 32-4×). The first dataset is CIFAR10 (as described in A. Krizhevsky, G. Hinton et al., "Learning Multiple Layers of Features from Tiny Images," 2009). The second dataset is composed in the same way as described in K. Xu, Z. Zhang, and F. Ren, "LAPRAN: A Scalable Laplacian Pyramid Reconstructive Adversarial Network for Flexible Compressive Sensing Reconstruction," in *Proceedings of the European Conference on Computer Vision (ECCV)*, 2018, pp. 485-500, which has 228,688 training samples and 867 testing samples. The testing samples are the non-overlapped image patches from Set5 (described in M. Bevilacqua, A. Roumy, C. Guillemot, and M. L. Alberi-Morel, "Low-Complexity Single-Image Super-Resolution Based on Nonnegative Neighbor Embedding," 2012) and Set14 (described in R. Zeyde, M. Elad, and M. Protter, "On Single Image Scale-Up Using Sparse-Representations," in *International Conference on Curves and Surfaces*, Springer, 2010, pp. 711-730). All the samples are of size 64×64 with three color channels (RGB).

The sensing is performed channel-wise in all the evaluations, i.e., for each framework of SS+Net, CS+Net and US+Net, each sample is first reshaped to three 4096-dimensional vectors corresponding to the three color channels.

Subsequently, three sensing operators corresponding to the three color channels are used to sense the three vectors of each sample, respectively. The sensed measurements from the three color channels are grouped together and then fed into the reconstruction network. Prior to the training, 5% of the training samples are randomly selected and separated out as the validation set.

The two reconstruction networks used for the evaluations are DCNet and ReconNet (as described in K. Kulkarni, S. Lohit, P. Turaga, R. Kerviche, and A. Ashok, "ReconNet: Non-Iterative Reconstruction of Images from Compressively Sensed Measurements," in *Proceedings of the IEEE Conference on Computer Vision and Pattern Recognition,* 2016, pp. 449-458). DCNet has the same network structure as the generator network of DCGAN (as described in A. Radford, L. Metz, and S. Chintala, "Unsupervised Representation Learning with Deep Convolutional Generative Adversarial Networks," arXiv preprint arXiv:1511.06434, 2015.). Some minor but necessary modifications to the structure of DCNet and ReconNet were made in order to perform image reconstruction and speed up the training.

In the beginning of the training process of SS+Net, the selection index I is randomly initialized with real values from the uniform distribution $U(0,n)$. The selective sensing operator and the reconstruction network are co-trained for 300 iterations, of which the first 150 iterations are used for the initial-training step and the rest are used for the fine-tuning step. Two different optimizers are used to optimize different components of SS+Net: an Adam optimizer with a learning rate of 0.001 is used to optimize reconstruction networks and a SGD optimizer with a learning rate of 100000 is used to optimize sensing operators. Using a high learning rate for training the selective sensing operators is because the gradient values with respect to the selection index I (calculated with Equation 4) turn out to be orders of magnitude smaller (because adjacent pixels in natural images mostly have very close pixel values) than the rest of the gradient values and the learning rate of 100000 performs well in the evaluations. For the training of the CS+Net and US+Net counterparts, all the other evaluation setups remain the same with SS+Net, except that there is no optimizer for sensing operators.

All the evaluations are conducted on a Dell PowerEdge T630 server equipped with dual sockets of Intel® Xeon® E5-2620 v4 CPU, 64 GB of DDR4 SDRAM, and four NVIDIA GEFORCE RTX 2080 Ti GPUs.

B. Evaluation Results

Figure 5:
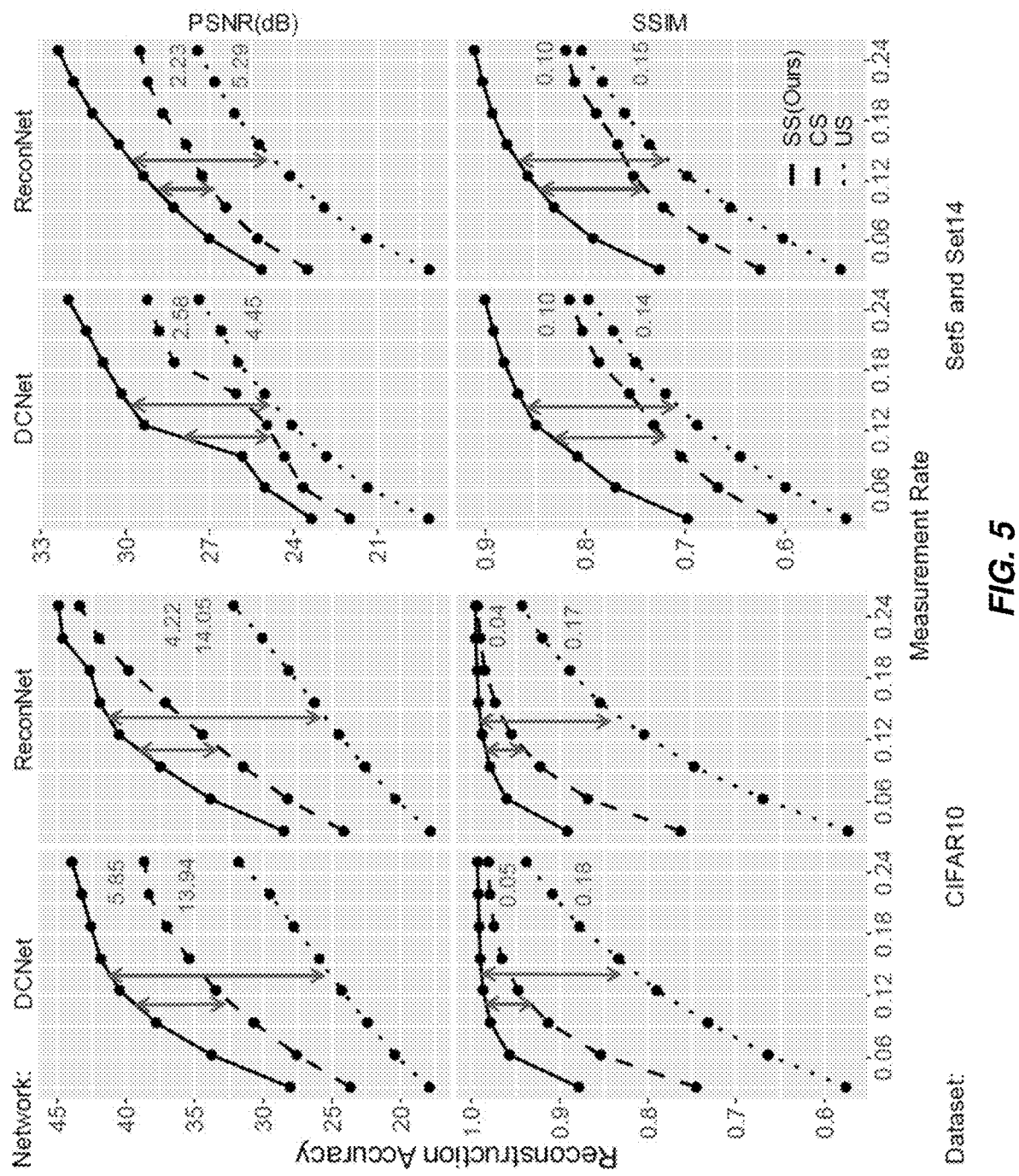
FIG. 5 is a graphical representation of a comparison of information acquisition performance among selective sensing, compressive sensing, and uniform subsampling measured in peak signal-to-noise ratio (PSNR) and structural similarity index measure (SSIM).

FIG. 5 is a graphical representation of a comparison of information acquisition performance among selective sensing (indicated as SS in the figure), compressive sensing (CS), and uniform subsampling (US) measured in PSNR and SSIM. The average PSNR and SSIM improvements of selective sensing over CS and US across all eight measurement rates are annotated on the figure. As shown in FIG. 5, selective sensing achieves up to 44.92 dB/0.9952 reconstruction PSNR/SSIM at the measurement rate of 0.25 (dimensionality reduction ratio of 4). Even at the low measurement rate of 0.03125 (dimensionality reduction ratio of 32), selective sensing still achieves at least 23.35 dB/0.6975 reconstruction PSNR/SSIM.

The evaluation results validate the hypothesis that the direct mapping from the selective sensed domain to the original image domain can be well approximated by existing reconstruction neural networks co-trained with the selective sensing operator, and data-driven nonuniform subsampling can well preserve signal information under the presence of the co-trained information decoding neural network. Furthermore, the evaluation results show that selective sensing consistently outperforms compressive sensing and uniform subsampling, especially at higher dimensionality reduction ratios.

The average PSNR/SSIM improvement of selective sensing over compressive sensing and uniform subsampling across all the evaluations is 3.73 dB/0.07 and 9.43 dB/0.16, respectively. As the only difference between SS+Net, CS+Net, and US+Net is the sensing operator used, the evaluation results imply that selective sensing better preserves signal information than compressive sensing and uniform subsampling as a result of the co-optimization of the sensing and reconstruction stages.

Figure 6:
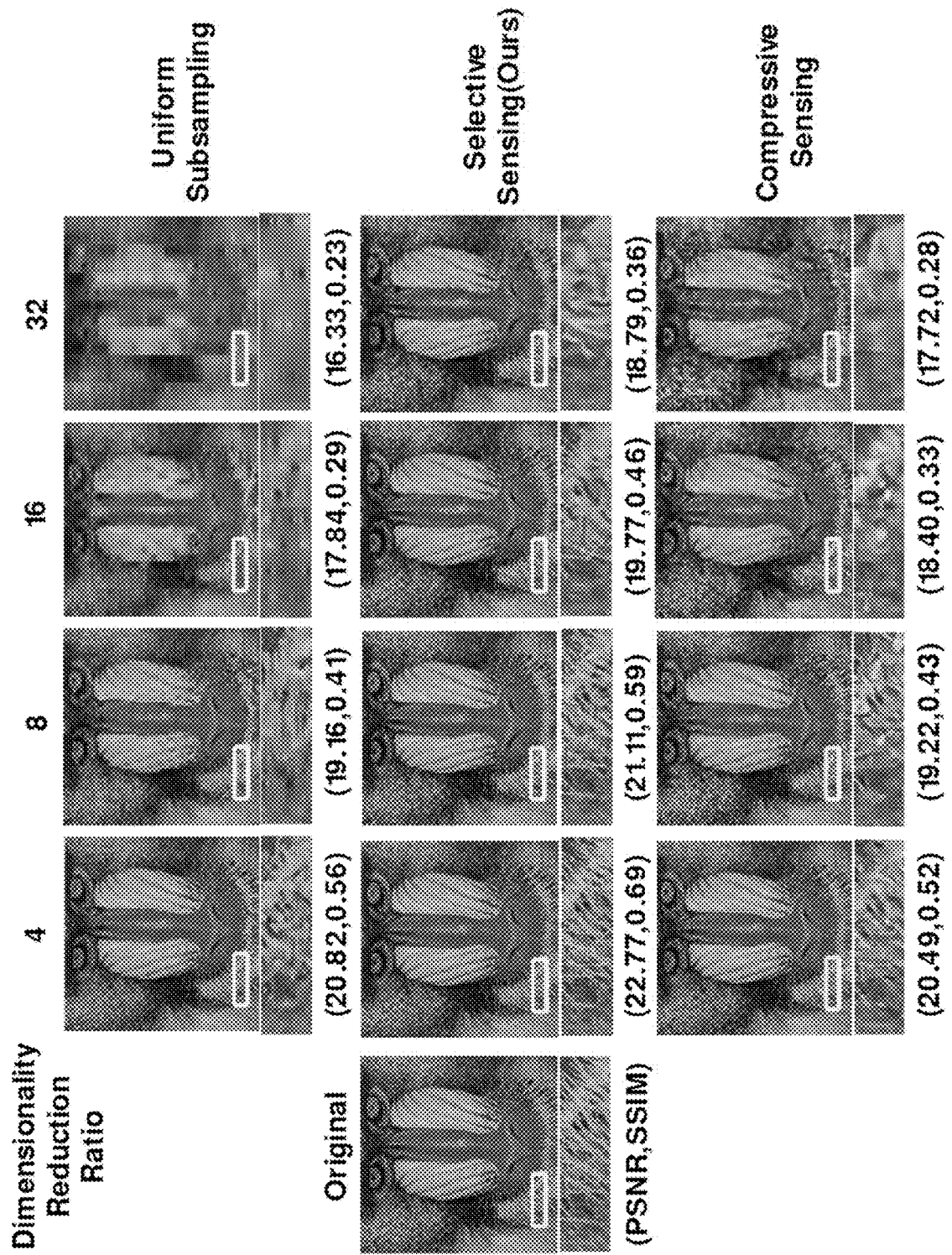
FIG. 6 is a graphical representation of a visual reconstruction quality comparison among selective sensing, compressive sensing and uniform subsampling.

FIG. 6 is a graphical representation of a visual reconstruction quality comparison among selective sensing, compressive sensing and uniform subsampling. The reconstruction network used is ReconNet, and the example image is from the Set14. Compared with the images in CIFAR10, the images in Set5/Set14 have more details, which makes the reconstruction inherently more difficult. One image from Set14 is taken as an example to illustrate the visual reconstruction quality comparison. Across all the dimensionality reduction ratios, selective sensing produces a sharper image with finer details presented (e.g., the beard and the skin textures) than compressive sensing and uniform subsampling across all dimensionality reduction ratios.

C. Comparison Against Random Indices

To understand the effectiveness of the trained selection indices in selective sensing over randomly generated selection indices, a trivial random subsampling approach called RS+Net is designed and compared with SS+Net. The evaluation setup for RS+Net is consistent with US+Net except that the selection indices of RS+Net are integers randomly generated from the uniform distribution $U(0,n)$. The evaluations are performed on CIFAR10 at the dimensionality reduction ratios of 32 and 8 (measurement rates of 0.03125 and 0.125) with ReconNet. At each measurement rate, eight different sets of selection indices are randomly generated, based on which eight reconstruction networks are trained from scratch, respectively, for RS+Net.

The final reconstruction accuracy of RS+Net on average is significantly lower than SS+Net counterparts. The average PSNR of RS+Net is 22.78 dB and 31.02 dB at measurement rates of 0.03125 and 0.125, which is 5.73 dB and 9.49 dB lower than the SS+Net counterparts, respectively. In addition, a large variance in the final reconstruction accuracy of RS+Net is observed across the eight sets of selection indices. Specifically, at the measurement rate of 0.03125 and 0.125, the gap between the maximum and the minimum PSNRs is 0.59 dB and 0.54 dB, and the standard deviation of PSNRs is 0.19 dB and 0.20 dB, respectively.

Furthermore, to illustrate the superiority of the co-optimized selection indices in selective sensing over random selection indices, two reconstruction networks are also trained from scratch at the measurement rates of 0.03125 and 0.0125 with the corresponding pre-trained selection indices from SS+Net remaining fixed in the training process, respectively. The final reconstruction accuracy is 28.49 dB and 40.47 dB at the measurement of 0.03125 and 0.0125, which is 5.71 dB and 9.45 dB higher than the original RS+Net counterparts using random selection indices, respectively.

These results indicate that random selection indices are insufficient for retaining information of interest with respect to the subsequent reconstruction network. Differently, learned indices from co-training a selective sensing operator with a subsequent reconstruction network can significantly improve the selective sensing performance in terms of retaining the information of interest for high-accuracy reconstruction (see FIGS. 3 and 4).

D. Comparison Against Deep Probabilistic Subsampling

Deep probabilistic subsampling (DPS) is a method (proposed in I. A. Huijben, B. S. Veeling, and R. J. van Sloun, "Deep Probabilistic Subsampling for Task-Adaptive Compressed Sensing," in *International Conference on Learning Representations*, 2019) that co-optimizes a subsampling scheme and a subsequent neural network. The main difference between DPS and selective sensing is that the subsampling indices I in DPS are randomly generated from a specific random distribution. Consequently, I in DPS is different with respect to each input signal for sensing. Compared to the static subsampling indices I in selective sensing, DPS introduces more computation to generate the dynamic subsampling indices in the sensing stage, which is undesired in the applications targeted by selective sensing.

Selective sensing is compared against DPS on CIFAR10 and Set5/Set14 datasets at the measurement rates of 0.03125 (1/32), 0.0625(1/16), 0.125(1/8), and 0.25(1/4) using ReconNet and DCNet as the reconstruction network, respectively. To reveal the impact of the different sensing operators in selective sensing and DPS, the comparison is performed between the cases using the same reconstruction network, for ReconNet and DCNet, respectively. The evaluation results are summarized in Table 1 and Table 2.

TABLE 1

Reconstruction performance comparison between DPS and selective sensing on CIFAR10 with ReconNet

| | MR | 1/32 | 1/16 | 1/8 | 1/4 |
|---|---|---|---|---|---|
| DPS | PSNR (dB) | 25.43 | 29.40 | 36.17 | 44.57 |
| | SSIM | 0.82 | 0.90 | 0.97 | 0.99 |
| | STPS (ms) | 3.97 | 7.32 | 15.23 | 28.35 |
| Selective sensing | PSNR (dB) | 28.51 | 33.84 | 40.51 | 44.92 |
| | SSIM | 0.89 | 0.96 | 0.99 | 1.00 |
| | STPS (ms) | 0.05 | 0.05 | 0.05 | 0.05 |

TABLE 2

Reconstruction accuracy comparison between DPS and selective sensing on Set5/Set14 with DCNet

| | MR | 1/32 | 1/16 | 1/8 | 1/4 |
|---|---|---|---|---|---|
| DPS | PSNR (dB) | 23.00 | 24.55 | 26.52 | 26.74 |
| | SSIM | 0.64 | 0.69 | 0.76 | 0.77 |
| | STPS (ms) | 4.15 | 7.39 | 14.62 | 29.72 |
| Selective sensing | PSNR (dB) | 23.36 | 25.02 | 29.33 | 32.04 |
| | SSIM | 0.70 | 0.77 | 0.85 | 0.90 |
| | STPS (ms) | 0.07 | 0.06 | 0.06 | 0.06 |

On CIFAR10 and Set5/Set14 datasets, the reconstruction accuracy of selective sensing measured in PSNR and SSIM is 3.05 dB/0.04 and 2.23 dB/0.09 higher than the DPS counterparts on average, respectively. To compare the computation cost of selective sensing and DPS in the sensing stage, the running time of the sensing process is first measured and then the average sensing time per sample (STPS) is calculated in each evaluation. The STPS of selective sensing is at least two orders of magnitude shorter than that of DPS in all the evaluations and almost constant across different measurement rates. This is due to the computation-free nature of selective sensing. Specifically, the sensing operator in selective sensing requires no computation nor any form of encoding upon signal samples.

The data-driven subsampling index I in selective sensing is static—the selection of data samples requires only simple control of sample index (e.g., simple MUX control or manipulation of memory pointers). Differently, the STPS of DPS is approximately proportional to the measurement rate. This is because the subsampling indices I in DPS, whose size is proportional to the measurement rate, are randomly generated with respect to each data sample. Such a dynamic subsampling process requires the computation of subsampling indices I from a random distribution, whose complexity is at least two orders of magnitude larger than that of selective sensing.

Overall, selective sensing outperforms DPS in terms of reconstruction accuracy with much reduced computation cost and much faster sensing speed in the sensing stage, which makes selective sensing more suitable for the application in resource-constrained IoT sensors and/or high-data-rate sensor devices.

E. Discussion on Nonconvexity and Incoherence

From the optimization perspective, both the original problem in Equation 2 and the relaxed problem in Equation 6 are non-convex problems. Thus, it is not guaranteed that the gradient-descent-based Algorithm 1 can find the globally optimal solution of the problem in Equation 2. Additionally, it is known that deep neural network models are typically non-convex with a great number of local minima. The gap between local and global minima remains an open topic of research. Similarly, the approach described herein leverages the gradient-descent algorithm and relaxed problem in Equation 6 to find the local minimum of the problem in Equation 2 that are empirically proven to have outstanding performance. Specifically, the evaluation results show that the proposed Algorithm 1 can consistently find a local optimum of the indices I that has significantly better sensing performance than random indices and random Gaussian sensing matrices in terms of the reconstruction accuracy across different datasets and compression ratios.

It should also be noted that selective sensing, similar to many data-driven compressive sensing methods that co-train a sensing matrix with a reconstruction network, does not explicitly require the incoherence of sensing matrices nor sparsity basis. Previous studies have empirically shown that these data-driven compressive sensing methods can achieve significantly higher reconstruction performance compared to conventional model-based methods that have the incoherence and sparsity requirements.

Similarly, the evaluation results on various datasets, reconstruction networks, and measurement rates also show that selective sensing consistently outperforms compressive sensing and uniform subsampling counterparts.

Furthermore, compared to a previous data-driven compressive sensing method, selective sensing can achieve 6.02 dB/0.031 and 0.72 dB/0.007 higher reconstruction PSNR/SSIM on the CIFAR10 database with the same reconstruction network at the measurement rate of 0.125 and 0.25, respectively. These comparison results are the strong empirical evidence that selective sensing can well preserve signal information without the incoherence nor sparsity requirements.

V. COMPUTER SYSTEM

Figure 7:
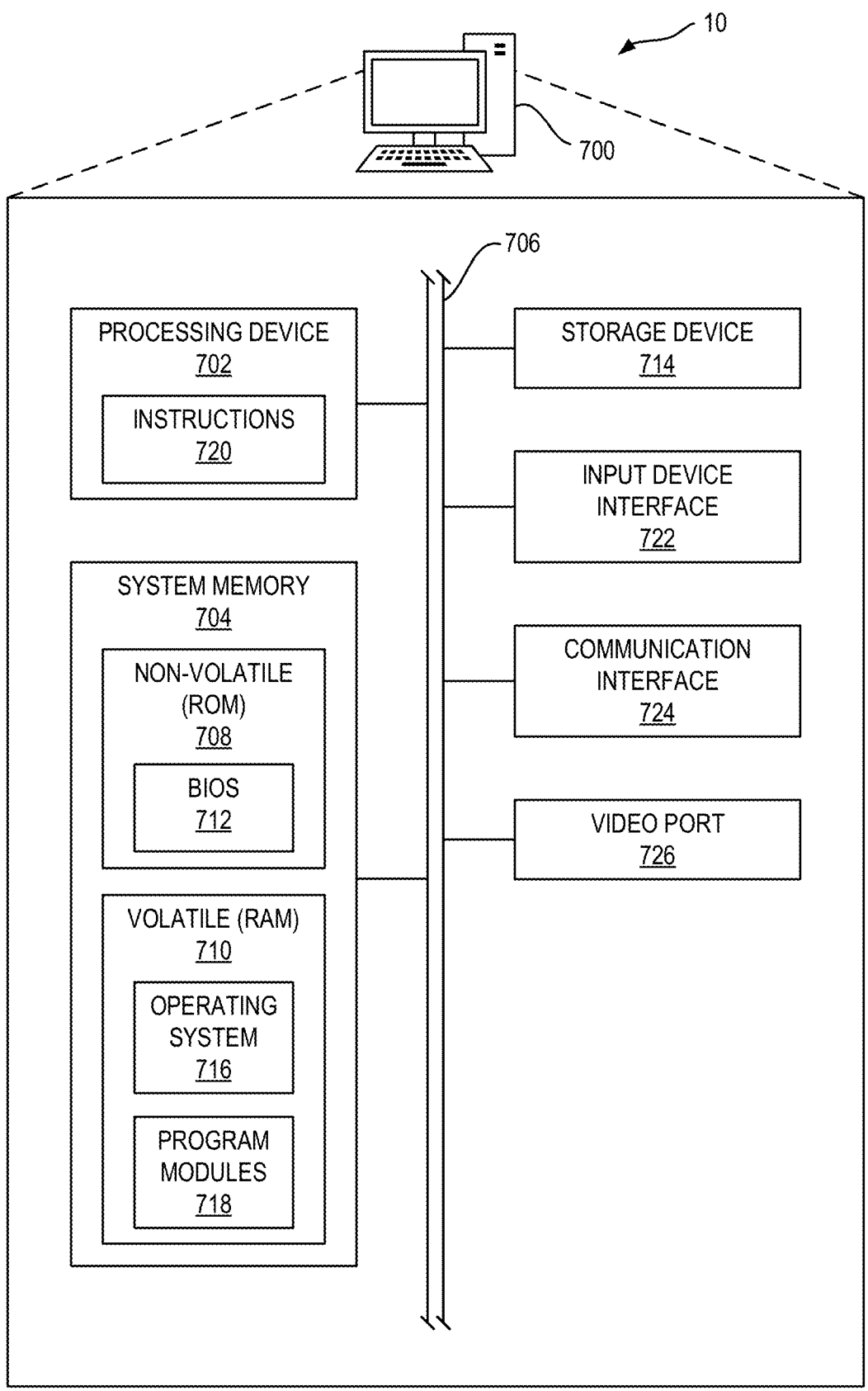
FIG. 7 is a block diagram of a signal processing system suitable for implementing selective sensing according to embodiments disclosed herein.

FIG. 7 is a block diagram of the signal processing system 10 suitable for implementing selective sensing according to embodiments disclosed herein. Some or all of the signal processing system 10 can include or be implemented as a computer system 700, which comprises any computing or electronic device capable of including firmware, hardware, and/or executing software instructions that could be used to perform any of the methods or functions described above, such as selectively sensing a signal of interest. In this regard, the computer system 700 may be a circuit or circuits included in an electronic board card, such as a printed circuit board (PCB), a server, a personal computer, a desktop computer, a laptop computer, an array of computers, a personal digital assistant (PDA), a computing pad, a mobile device, or any other device, and may represent, for example, a server or a user's computer. In some examples, the computer system 700 may incorporate the signal processor 14 and/or the sensor device 12.

The exemplary computer system 700 in this embodiment includes a processing device 702 or processor, a system memory 704, and a system bus 706. The system memory 704 may include non-volatile memory 708 and volatile memory 710. The non-volatile memory 708 may include read-only memory (ROM), erasable programmable read-only memory (EPROM), electrically erasable programmable read-only memory (EEPROM), and the like. The volatile memory 710 generally includes random-access memory (RAM) (e.g., dynamic random-access memory (DRAM), such as synchronous DRAM (SDRAM)). A basic input/output system (BIOS) 712 may be stored in the non-volatile memory 708 and can include the basic routines that help to transfer information between elements within the computer system 700.

The system bus 706 provides an interface for system components including, but not limited to, the system memory 704 and the processing device 702. The system bus 706 may be any of several types of bus structures that may further interconnect to a memory bus (with or without a memory controller), a peripheral bus, and/or a local bus using any of a variety of commercially available bus architectures.

The processing device 702 represents one or more commercially available or proprietary general-purpose processing devices, such as a microprocessor, central processing unit (CPU), or the like. More particularly, the processing device 702 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 702 is configured to execute processing logic instructions for performing the operations and steps discussed herein.

In this regard, the various illustrative logical blocks, modules, and circuits described in connection with the embodiments disclosed herein may be implemented or performed with the processing device 702, which may be a microprocessor, FPGA, DSP, ASIC, or other programmable logic device, a discrete gate or transistor logic, discrete hardware components, or any combination thereof designed to perform the functions described herein. Furthermore, the processing device 702 may be a microprocessor, or may be any conventional processor, controller, microcontroller, or state machine. The processing device 702 may also be implemented as a combination of computing devices (e.g., a combination of a DSP and a microprocessor, a plurality of microprocessors, one or more microprocessors in conjunction with a DSP core, or any other such configuration).

The computer system 700 may further include or be coupled to a non-transitory computer-readable storage medium, such as a storage device 714, which may represent an internal or external hard disk drive (HDD), flash memory, or the like. The storage device 714 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as optical disks, magnetic cassettes, flash memory cards, cartridges, and the like, may also be used in the operating environment, and, further, that any such media may contain computer-executable instructions for performing novel methods of the disclosed embodiments.

An operating system 716 and any number of program modules 718 or other applications can be stored in the volatile memory 710, wherein the program modules 718 represent a wide array of computer-executable instructions corresponding to programs, applications, functions, and the like that may implement the functionality described herein in whole or in part, such as through instructions 720 on the processing device 702. The program modules 718 may also reside on the storage mechanism provided by the storage device 714. As such, all or a portion of the functionality described herein may be implemented as a computer program product stored on a transitory or non-transitory computer-usable or computer-readable storage medium, such as the storage device 714, non-volatile memory 708, volatile memory 710, instructions 720, and the like. The computer program product includes complex programming instructions, such as complex computer-readable program code, to cause the processing device 702 to carry out the steps necessary to implement the functions described herein.

An operator, such as the user, may also be able to enter one or more configuration commands to the computer system 700 through a keyboard, a pointing device such as a mouse, or a touch-sensitive surface, such as the display device, via an input device interface 722 or remotely through a web interface, terminal program, or the like via a communication interface 724. The communication interface 724 may be wired or wireless and facilitate communications with any number of devices via a communications network in a direct or indirect fashion. An output device, such as a display device, can be coupled to the system bus 706 and driven by a video port 726. Additional inputs and outputs to the computer system 700 may be provided through the system bus 706 as appropriate to implement embodiments described herein.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

What is claimed is:

1. A method for performing subsampling of data to prepare the data for a pre-selected information processing task, the method comprising:
   selectively sensing, by a controller using a selection index, a signal of interest received by a sensor, the selective sensing taking place while co-training of the selection index;

providing, by the controller, the selectively sensed signal of interest to a processor co-training a neural network model while the controller receives the signal of interest from the sensor and provides control signals to the sensor; and receiving, from the processor, feedback from the neural network model to the controller, the feedback enabling iterative co-training, by the processor, of the selection index, wherein the controller and the sensor are implemented together on a chip, the controller controlling the sensor, and wherein the processor is configured to execute the neural network model.

2. The method of claim 1, further comprising co-training the selection index with the neural network model for the pre-selected information processing task.

3. The method of claim 1, wherein the selection index comprises a multi-channel selection index.

4. The method of claim 1, wherein the selection index comprises at least one of a vector, a matrix, or a multi-dimensional tensor.

5. The method of claim 1, wherein the selectively sensed signal has a reduced dimensionality from raw data of the signal of interest without performing signal or data processing on the chip.

6. The method of claim 1, wherein the selective sensing of the signal of interest is a sub-Nyquist sampling of the signal of interest.

7. The method of claim 1, wherein the signal of interest comprises one or more of an image signal, a video signal, an environmental measurement signal, and a captured electromagnetic signal.

8. A sensor device for performing subsampling of data to prepare the data for a pre-selected information processing task, the sensor device comprising:
 a sensor; and
 a controller coupled to the sensor and configured to:
  selectively sense, using a selection index, a signal of interest received by a sensor, the selective sensing taking place while co-training of the selection index;
  providing the selectively sensed signal of interest to a processor co-training a neural network model while the controller receives the signal of interest from the sensor and provides control signals to the sensor; and
  receiving, from the processor, feedback from the neural network model to the controller, the feedback enabling iterative co-training, by the processor, of the selection index,
  wherein the controller and the sensor are implemented together on a chip, the controller controlling the sensor, and
  wherein the processor is configured to execute the neural network model.

9. The sensor device of claim 8, wherein the controller comprises control logic configured to control elements of the sensor to capture the selectively sensed signal according to the selection index.

10. The sensor device of claim 9, wherein the control logic is reconfigurable to control the elements of the sensor according to another selection index.

11. The sensor device of claim 8, wherein the controller comprises a microprocessor.

12. The sensor device of claim 11, wherein the microprocessor is configured to receive raw sensor data from the sensor and sample the raw sensor data to produce the selectively sensed signal.

13. The sensor device of claim 8, further comprising a memory storing a plurality of selection indexes, each of the plurality of selection indexes being pretrained for one of a plurality of processing tasks.

14. The sensor device of claim 13, wherein the controller is configured to dynamically select and apply one of the plurality of selection indexes at runtime.

15. The sensor device of claim 8, wherein the controller is further configured to provide the selectively sensed signal to the signal processor implementing the neural network model for the pre-selected information processing task.

16. The sensor device of claim 8, wherein the signal processor is off-chip from the sensor.

17. A signal processing system for performing subsampling of data to prepare the data for a pre-selected information processing task, the signal processing system comprising:
 a signal processor;
 a sensor; and
 a controller coupled to the sensor and in communication with the signal processor, wherein the controller is configured to:
  selectively sense, using a selection index, a signal of interest received by a sensor, the selective sensing taking place while co-training of the selection index;
  provide the selectively sensed signal of interest to a signal processor co-training a neural network model while the controller receives the signal of interest from the sensor and provides control signals to the sensor; and
  receiving, from the signal processor, feedback from the neural network model to the controller, the feedback enabling iterative co-training, by the signal processor, of the selection index,
  wherein the controller and the sensor are implemented together on a chip, the controller controlling the sensor, and
  wherein the signal processor is configured to execute the neural network model.

18. The signal processing system of claim 17, wherein the sensor and the controller are implemented on a first device and the signal processor is implemented on a second device.

19. The signal processing system of claim 17, wherein the sensor, the controller, and the signal processor are implemented on a common device.

20. The signal processing system of claim 17, wherein the signal processor is implemented remotely at a network edge device.

* * * * *